(12) United States Patent
Yamazaki et al.

(10) Patent No.: US 10,131,395 B2
(45) Date of Patent: Nov. 20, 2018

(54) TANK COVER STRUCTURE FOR MOTORCYCLE

(71) Applicant: HONDA MOTOR CO., LTD., Tokyo (JP)

(72) Inventors: Takayuki Yamazaki, Wako (JP); Yoshinori Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/404,363

(22) PCT Filed: Feb. 26, 2013

(86) PCT No.: PCT/JP2013/054919
§ 371 (c)(1),
(2) Date: Nov. 26, 2014

(87) PCT Pub. No.: WO2013/179703
PCT Pub. Date: Dec. 5, 2013

(65) Prior Publication Data
US 2015/0166137 A1   Jun. 18, 2015

(30) Foreign Application Priority Data

May 28, 2012  (JP) ................. 2012-120676

(51) Int. Cl.
*B62J 23/00*   (2006.01)
*B62J 35/00*   (2006.01)
*B62J 15/00*   (2006.01)

(52) U.S. Cl.
CPC ............. *B62J 23/00* (2013.01); *B62J 15/00* (2013.01); *B62J 35/00* (2013.01)

(58) Field of Classification Search
CPC .................................. B62J 23/00; B62J 35/00
See application file for complete search history.

(56) References Cited

U.S. PATENT DOCUMENTS

| 7,621,362 | B2 * | 11/2009 | Ogawa ............ B62J 1/08 180/219 |
| 8,016,321 | B2 * | 9/2011 | Shimomura ....... B62J 35/00 280/830 |
| 2007/0205631 | A1 * | 9/2007 | Nobuhira ........ B62J 23/00 296/181.1 |

FOREIGN PATENT DOCUMENTS

| JP | 10-181658 A | 7/1998 |
| JP | 2006-082708 A | 3/2006 |

(Continued)

OTHER PUBLICATIONS

Extended European Search Report issued in corresponding EP Application No. 13797497.8 dated Dec. 7, 2015 (in English).

(Continued)

*Primary Examiner* — Joseph M Rocca
*Assistant Examiner* — Felicia L. Brittman
(74) *Attorney, Agent, or Firm* — Birch, Stewart, Kolasch & Birch, LLP

(57) ABSTRACT

A tank cover can be easily exchanged in a tank cover structure for a motorcycle. In the tank cover structure for the motorcycle which has a handle 25, a seat 12 on which an occupant sits, a fuel tank arranged behind the handle 25 and in front of the seat 12, and a tank cover 60 covering the fuel tank, the tank cover 60 is divided into a front cover 82 having a wide portion 82B at which the tank cover 60 is widest at the front end of the fuel tank, a rear cover 83A having a narrow knee grip portion 83 which is continued to the seat 12 at the rear portion of the front cover 82, and a lower cover 84 extending in the front-and-rear direction to form the lower portion of the tank cover 60.

18 Claims, 25 Drawing Sheets

(56) References Cited

FOREIGN PATENT DOCUMENTS

| JP | 2007-145131 A | 6/2007 |
|---|---|---|
| JP | 2009-161016 A | 7/2009 |
| JP | 3159300 U | 5/2010 |

OTHER PUBLICATIONS

Office Action issued in corresponding Canadian Patent Application No. 2,873,936 dated Nov. 23, 2015 (in English).
European Office Action, dated Mar. 20, 2018, for European Application No. 13797497.8.

* cited by examiner

TANK COVER STRUCTURE FOR MOTORCYCLE

TECHNICAL FIELD

The present invention relates to a tank cover structure for a motorcycle having a tank cover which covers a fuel tank.

BACKGROUND ART

It is known that a motorcycle having a tank cover for covering a fuel tank is configured so that the tank cover comprises a center cover having an opening through which a fuel filler port of the fuel tank is exposed and a pair of side covers joined to both the right and left sides of the center cover (see Patent Document 1, for example).

PRIOR ART DOCUMENT

Patent Document

Patent Document 1: Japanese Utility Model Registration No. 3159300

SUMMARY OF THE INVENTION

Problem to be Solved by the Invention

A tank cover of the motorcycle is a portion which is apt to be damaged because it is exposed to the outside. In the case of a tank cover which is configured to be roughly divided into right and left sides as in the case of prior arts, when the tank cover is required to be exchanged owing to damage or the like, it has been hitherto difficult to exchange the tank cover because the whole cover at a damaged side must be exchanged.

The present invention has been implemented in view of the foregoing situation, and has an object to enable a tank cover to be easily exchanged in a tank cover structure for a motorcycle.

Means of Solving the Problem

In order to attain the above object, a tank cover structure for a motorcycle having a handle (25), a seat (12) on which an occupant sits, a fuel tank (24) disposed behind the handle (25) and in front of the seat (12), and a tank cover (60) covering the fuel tank (24), is characterized in that the tank cover (60) is divided into a front cover (82) having a wide portion (82B) at which the tank cover (60) is widest in a width direction at the front side of the fuel tank (24), a rear cover (83) having a narrow knee grip portion (83A) continued to the seat (12) at the rear side of the cover (82), and a lower cover (84) extending in a front-and-rear direction to form a lower portion of the tank cover (60).

According to the present invention, the tank cover covering the fuel tank is divided into the front cover having the wide portion at which the tank cover is widest in the width direction at the front side of the fuel tank, the rear cover having the narrow knee grip portion continued to the seat at the rear side of the front cover, and the lower cover extending in the front-and-rear direction to form the lower portion of the tank cover. Accordingly, each of the front cover, the rear cover and the lower cover can be exchanged in accordance with an exchange-desired site. That is, according to this invention, the front cover having the wide portion which is apt to be damaged because it is wide in the width direction can be independently exchanged. Furthermore, the rear cover which is apt to be damaged by knee grip can be independently exchanged. Still furthermore, the lower cover which is apt to be damaged by an occupant's shoe can be independently exchanged. Therefore, the tank cover can be easily exchanged.

Furthermore, in the present invention, the front cover (82) extends from the wide portion (82B) to a rear upper side so as to be continued to an upper surface of the fuel tank (24), the rear cover (83) extends from the knee grip portion (83A) to a front lower side, and the tank cover (60) has a center cover (85) as a separate body that is sandwiched between the front cover (82) and the rear cover (83) to fill a space.

According to the present invention, the center cover is sandwiched between the front cover and the rear cover, and thus it is hardly damaged. Furthermore, the center cover is sandwiched between the front cover and the rear cover and fills the space. Therefore, the support stiffness of the center cover can be enhanced although the center cover is configured as a separate body.

Furthermore, the present invention further comprises a top cover (81) covering the upper surface of the fuel tank (24).

According to the present invention, the upper surface of the fuel tank can be covered by the top cover.

In the present invention, an inner cover (86) is provided between the front cover (82) and the top cover (81) in front view.

According to the present invention, the inner cover is provided between the front cover and the top cover in front view. Therefore, the influence of travelling wind from the front side on the front cover can be reduced, and the front cover can be surely fixed. Furthermore, the direction of the traveling wind can be controlled by the inner cover.

In the present invention, the front cover (82) is fixed to the top cover (81).

According to the present invention, the front cover is fixed to the top cover, so that it is unnecessary to provide the fuel tank with a fixing portion for the front cover, and thus the structure can be simplified.

Furthermore, in the present invention, the fuel tank (24) has a fuel filler opening (70) at an upper portion thereof, and the top cover (81) is secured to a securing ring (72) secured to the fuel filler opening (70).

According to the present invention, the top cover is secured to the securing ring secured to the fuel filler opening of the fuel tank, so that the number of fixing portions can be minimized.

In the present invention, a garnish (89) is provided to a rear end of the rear cover (83).

According to the present invention, the rear cover can be reinforced by the garnish.

In the present invention, a key cylinder (52) is provided inside the garnish (89), and the key cylinder (52) is configured to switch locking/unlocking of a seat lock for locking the seat (12).

According to the present invention, the key cylinder for seat lock can be disposed at the reinforced portion inside the garnish.

Effect of the Invention

In the tank cover structure for the motorcycle according to the present invention, each of the front cover, the rear cover and the lower cover of the tank cover can be exchanged in accordance with an exchange-desired site.

The center cover is sandwiched between the front cover and the rear cover, and thus it is hardly damaged. The support stiffness of the center cover can be enhanced although the center cover is configured as a separate body.

The upper surface of the fuel tank can be covered by the top cover.

Furthermore, the influence of the traveling wind from the front side on the front cover can be reduced by the inner cover in front view, and the front cover can be surely fixed. The direction of the traveling wind can be controlled by the inner cover.

Furthermore, it is unnecessary to provide the fuel tank with a fixing portion for the front cover, and the structure can be simplified.

The number of fixing portions of the tank cover can be minimized.

The rear cover can be reinforced by the garnish.

The key cylinder for seat lock can be disposed at the reinforced portion inside the garnish.

BRIEF DESCRIPTION OF THE DRAWINGS

FIG. 12 is a diagram showing an upper cover, wherein FIG. 12(a) is a plan view and FIG. 12(b) is a side view;

MODE FOR CARRYING OUT THE INVENTION

Figure 1:
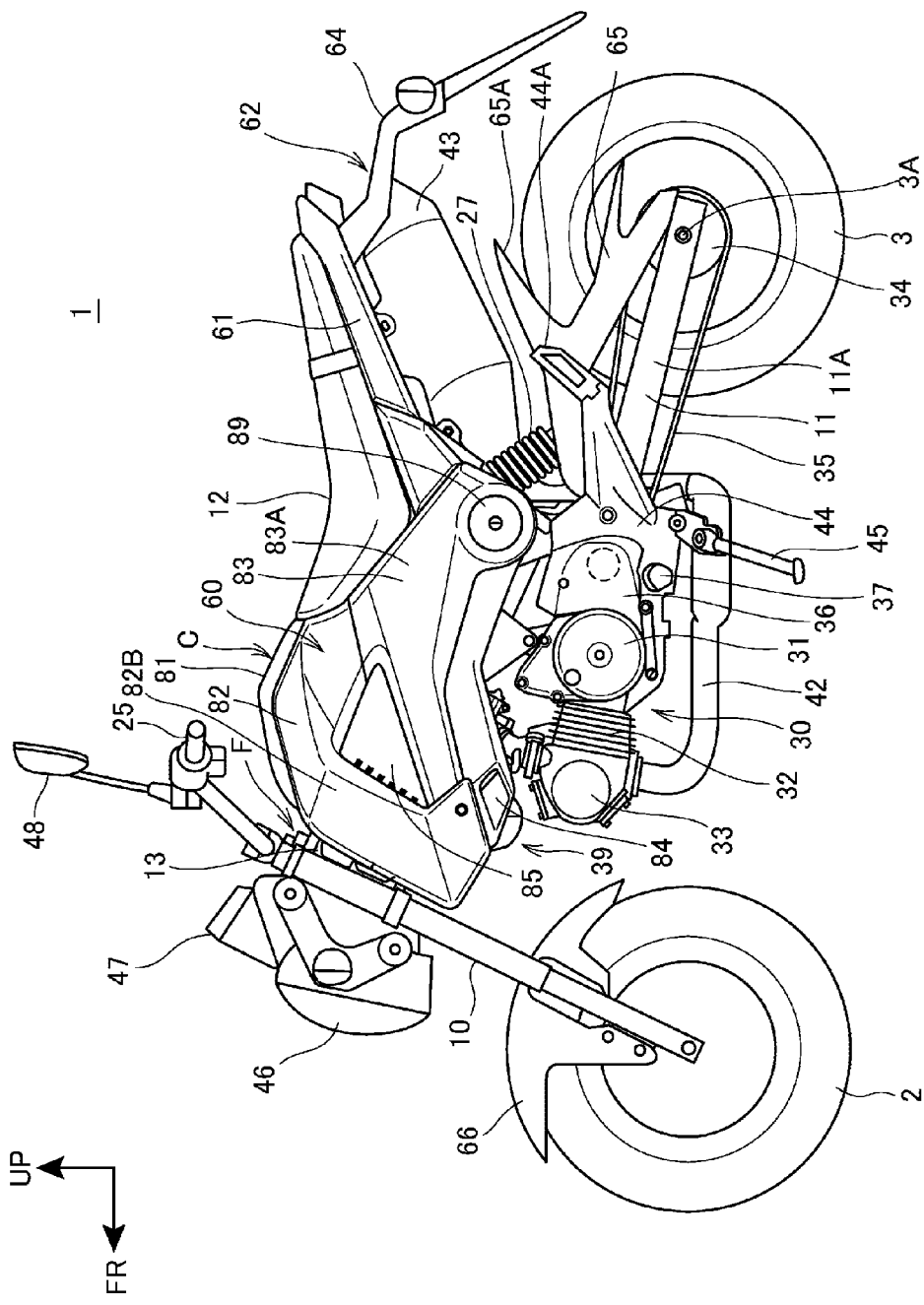
FIG. 1 is a left side diagram showing a motorcycle according to an embodiment of the present invention.

A motorcycle having a tank cover structure according to an embodiment of the present invention will be described with reference to the drawings. In the description, directions such as a front-and-rear direction, a right-and-left direction and an up-and-down direction are the same as the directions associated with a vehicle body not otherwise specified. In the figures, reference character FR represents the front side of the vehicle, reference character UP represents the upper side of the vehicle and reference character LE represents the left side of the vehicle.

FIG. 1 is a left side view showing a motorcycle according to an embodiment of the present invention.

The motorcycle 1 is a saddle type vehicle in which an engine 30 is disposed at the center in the front-and-rear direction of a vehicle body frame F, a front fork 10 for supporting a front wheel 2 is steerably supported at the front end of the vehicle body frame F, a swing arm 11 for supporting a rear wheel 3 is provided at the rear portion side of the vehicle body frame F, and a seat 12 on which an occupant (rider) sits is provided at the upper side of the vehicle body frame F. Most of the vehicle body frame F is covered by a vehicle body cover C formed of resin.

Figure 2:
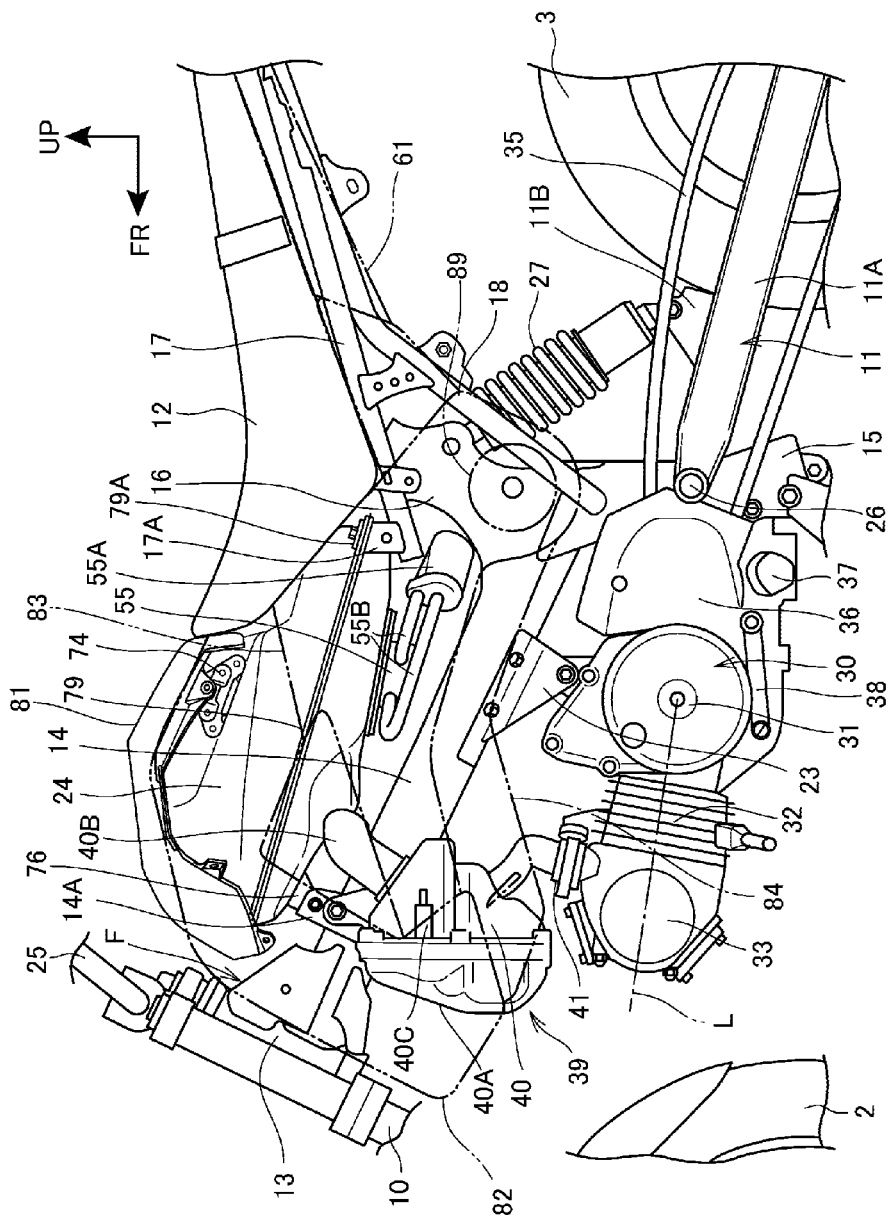
FIG. 2 is a left side view showing the motorcycle under a state that most of a vehicle body cover is detached from the motorcycle.
Figure 3:
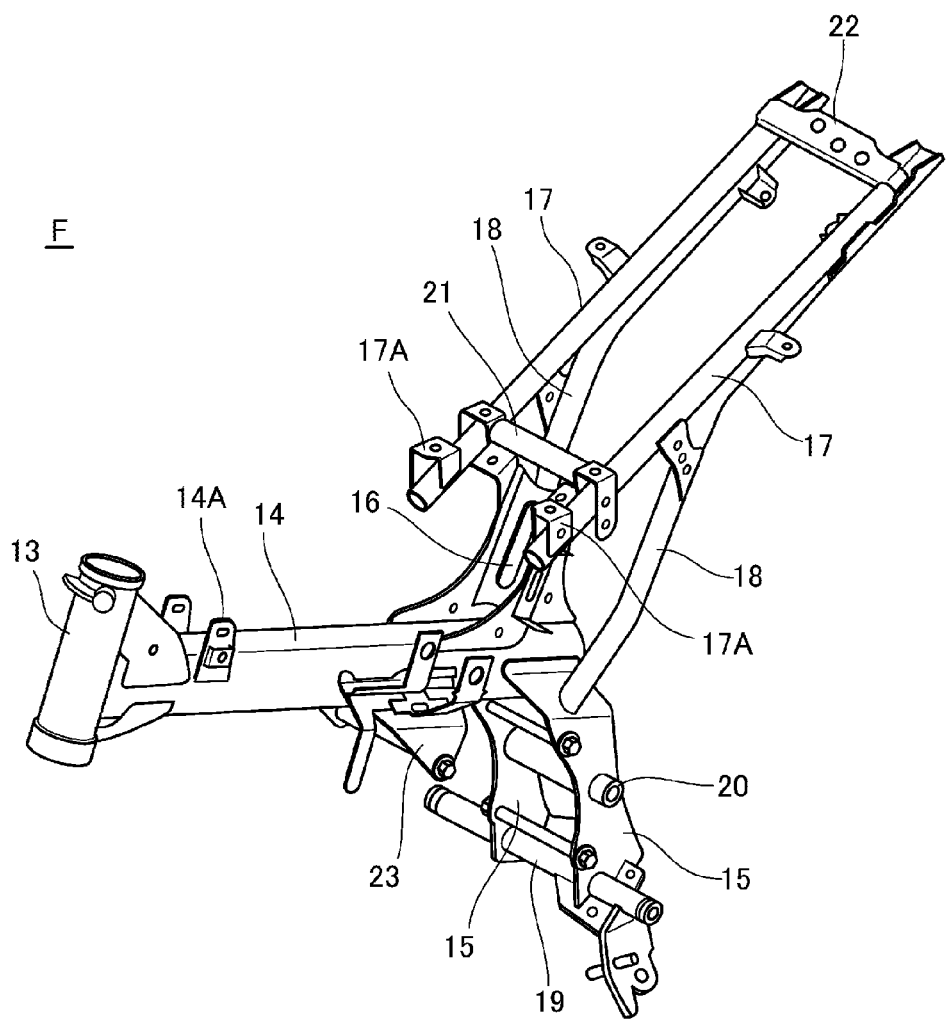
FIG. 3 is a perspective view showing a vehicle body frame.

FIG. 2 is a left side view of the motorcycle 1 under a state that most of parts of the vehicle body cover C are detached. FIG. 3 is a perspective view of the vehicle body frame F.

Referring to FIGS. 1 to 3, the vehicle body frame F has a head pipe provided at the front end thereof, a single main frame 14 extending while inclined from the head pipe 13 to the rear lower side, a pair of right and left center frames 15, 15 which extend from the right and left side surfaces of the rear portion of the main frame 14 outwards in the vehicle width direction and then extend downwards, a suspension bracket 16 extending rearwards and upwards from the upper surface portion of the rear portion of the main frame 14 to the seat 12 side, a pair of right and left seat frames 17, 17 extending rearwards and upwards from the upper end portion of the suspension bracket 16 to the rear portion of the vehicle, and a pair of right and left sub frames 18, 18 which extend from the upper portions of the center frames 15, 15 rearwards and upwards behind the suspension bracket 16, connect to the intermediate portions in the front-and-rear direction of the seat frames 17, 17 and then extend to the rear ends of the seat frames 17, 17 along the lower surfaces of the seat frames 17, 17.

A lower cross pipe 19 through which the right and left center frames 15, 15 are connected to each other is provided to the lower portions of the center frames 15, 15. A cross pipe 20 through which the right and left center frames 15, 15 are connected to each other is provided to the intermediate portions in the up-and-down direction of the center frames 15, 15.

A front cross member 21 and a rear cross member 22 for connecting the right and left seat frames 17, 17 are provided to the front and rear portions of the seat frames 17, 17. Rear-side tank stays 17A to which a fuel tank 24 is fixed are provided at the front ends of the seat frames 17, 17.

Engine hungers 23 to which an engine 30 is fixed are provided to the lower surface of an intermediate portion in the front-and-rear direction of the main frame 14. Front tank stays 14A to which the fuel tank 24 is fixed are provided to the upper surface of the front portion of the main frame 14.

The fuel tank 24 is provided above the main frame 14, and extends from the rear side of the head pipe 13 to the front side of the seat frames 17, 17. A seat 12 is provided to be continuous with the rear portion of the fuel tank 24, and extends along the upper surfaces of the seat frames 17, 17 to the rear portion of the vehicle.

A pair of right and left front forks 10 are freely turnably supported by the head pipe 13 through a steering shaft (not shown), and the front wheel 2 is supported through a shaft by the lower portions of the front forks 10. A steering handle 25 is fixed to the upper ends of the front forks 10.

A swing arm 11 has a pair of right and left arm portions 11A (the arm portion at the right side is not shown) extending rearwards from the outer surface sides of the center frames 15, 15, and a cross member (not shown) connecting the right and left arm portions 11A, 11A at the front portion of the swing arm 11. The rear wheel 3 is supported by an axle 3A bridged between the arm portions 11A, 11A at the rear portion of the swing arm 11. The swing arm 11 is connected to the center frames 15, 15 by a pivot shaft 26 inserted in the front ends of the arm portions 11A, 11A, and is freely vertically swingable around the pivot shaft 26. The pivot shaft 26 is inserted in the cross pipe 20.

The lower end of a cylindrical rear cushion unit 27 is connected to a lower bracket 11B provided to the cross member of the swing arm 11, and the upper end of the rear cushion unit 27 is connected to the suspension bracket 16 of the vehicle body frame F.

The engine 30 is an air-cooled single cylinder type 4-cycle engine, and it is a horizontal engine whose cylinder shaft L is greatly tilted forwards until it is set to a state near to a substantially horizontal state. The engine 30 is constructed by a crank case 31 containing a crank shaft (not shown) and a transmission mechanism (not shown), a cylinder 32 and a cylinder head 33 which are successively arranged from the rear side. Since the engine 30 is a horizontal engine, the center of gravity of the vehicle body can be lowered. An output shaft (not shown) of the engine 30 protrudes from the left side surface of the rear portion of the crank case 31, and the rear wheel 3 is driven by a driving chain 35 suspended between a driving gear (not shown) of the output shaft and a driven gear 34 of the rear wheel 3. The driving gear of the output shaft is covered by a sprocket cover 36.

A pair of right and left steps 37 on which the feet (shoes) of an occupant sitting on the seat 12 are put are provided to the lower portions of the right and left side surfaces of the rear portion of the crank case 31. A shift pedal 38 used for transmission operation of the transmission mechanism is provided to the front side of the left-side step 37.

The upper portion of the front portion of the crank case 31 is fixed to the engine hungers 23, and the rear portion of the crank case 31 is fixed to the center frames 15, 15, whereby the engine 30 is supported by the vehicle body frame F.

In the motorcycle 1, the engine 30 as the horizontal engine is supported to be suspended from the main frame 14 which is inclined downwards. Therefore, a space is secured between the front portion of the main frame 14 and the engine 30, and an air intake device 39 is disposed in this space. The air intake device 39 has an air cleaner box 40 for cleaning sucked air, and a throttle body 41 which is connected to an air intake port in the upper surface of the engine 30 and supplies air from the air cleaner box 40 to the engine 30. The throttle body 41 is provided with an injector (not shown) for jetting fuel supplied from the fuel tank 24 to an air intake passage.

The air cleaner box 40 is formed like a large box which vertically expands substantially fully in the space between the lower surface of the front portion of the main frame 14 and the upper surface of the cylinder head 33. The air cleaner box 40 is divided into two parts in the front-and-rear direction, and maintenance can be easily performed on a filter in the air cleaner box 40 by detaching a lid portion 40A at the front side. Furthermore, an air intake duct serving as a port for taking air in the air cleaner box 40 passes from the rear portion of the left portion of the air cleaner box 40 through the left side of the main frame 14, extends rearwards and upwards, and opens rearwards at the lower side of the fuel tank 24. A fitting portion 40C projecting rearwards is formed at the end portion in the vehicle width direction of the air cleaner box 40.

The throttle body 41 is disposed between the cylinder head 33 and the main frame 14 at the rear side of the air cleaner box 40, and connected to an air intake port in the upper surface of the cylinder head 33.

An exhaust pipe 42 (FIG. 1) is connected to an exhaust port in the lower surface of the cylinder head 33. The exhaust pipe 42 is connected to a muffler 43 which extends from the exhaust port downwards, bends rearwards, extends rearwards, bends upwards at the rear side of the center frame 15, and then is fixed to the seat frame 17 at the right side.

A plate-like step stay 44 (FIG. 1) is provided to the side surface of each of the center frames 15, 15 so as to cover the front end of the swing arm 11 from the side, and a tandem step 44A on which a fellow passenger puts his/her foot is provided to the rear end of the step stay 44.

A side stand 45 (FIG. 1) is secured to the lower end of the left-side center frame 15.

A head light unit 46 and a meter unit 47 are secured to the front portion of the head pipe 13 through a stay (not shown). A back mirror 48 is provided to the handle 25.

The vehicle body cover C has a tank cover 60 covering the fuel tank 24, the main frame 14 and the air cleaner box 40, and a pair of right and left rear side covers 61 which cover the right and left seat frames 17, 17 from the sides thereof. A rear fender 62 is provided above the rear wheel 3. The rear fender 62 has a front-side rear fender 63 (FIG. 4) which covers the seat frames 17, 17 from the lower side and a rear-side rear fender 64 to which a license plate, etc. are secured. A chain cover 65 which covers the driving chain 35 from the upper side thereof is secured to the swing arm 11, and a mudguard portion 65A covering the rear wheel 3 from the upper side thereof is formed in the chain cover 65.

A front fender 66 which covers the front wheel 2 from the upper side is secured to the front fork 10.

Figure 4:
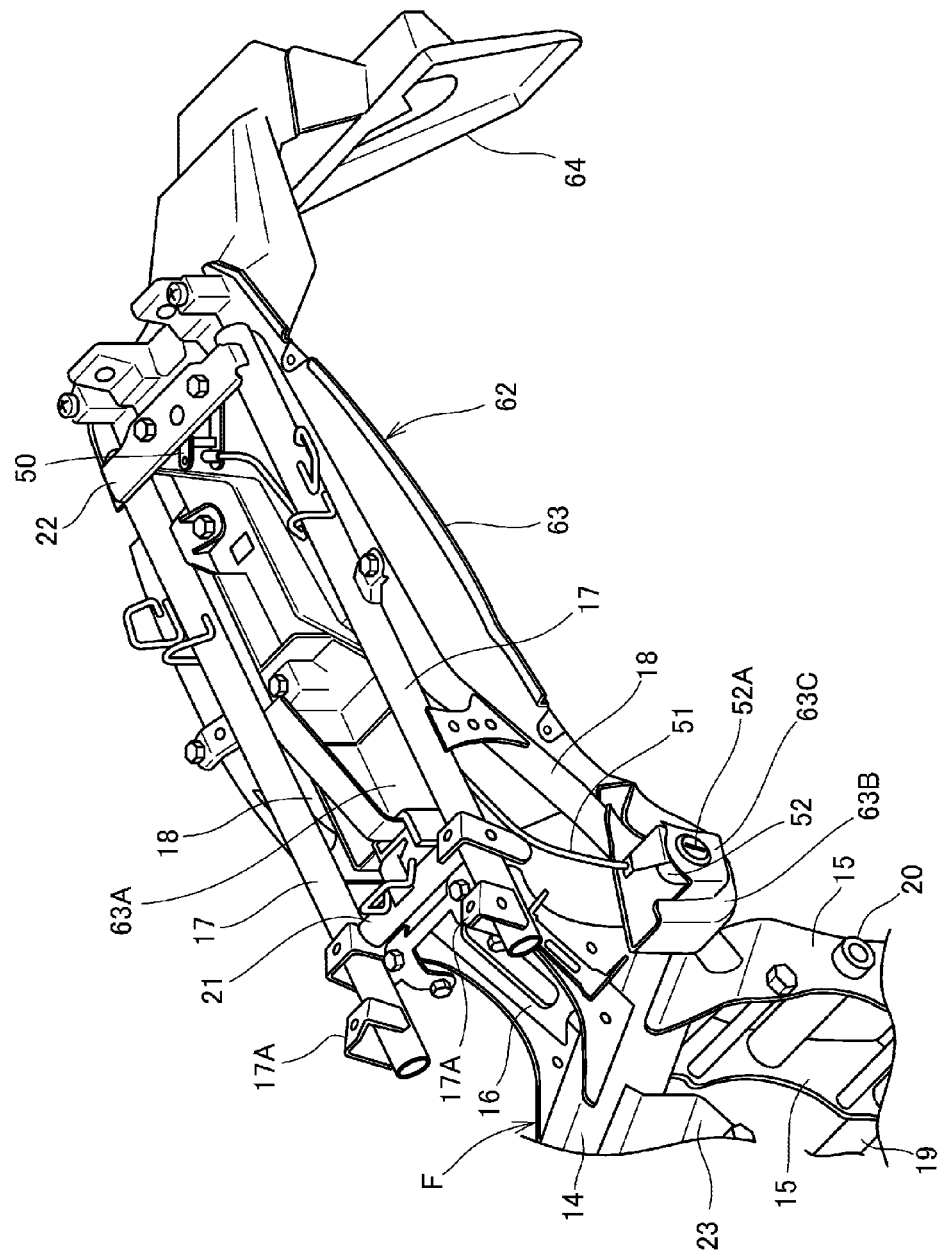
FIG. 4 is a perspective view showing a fixing state of a rear fender.
Figure 5:
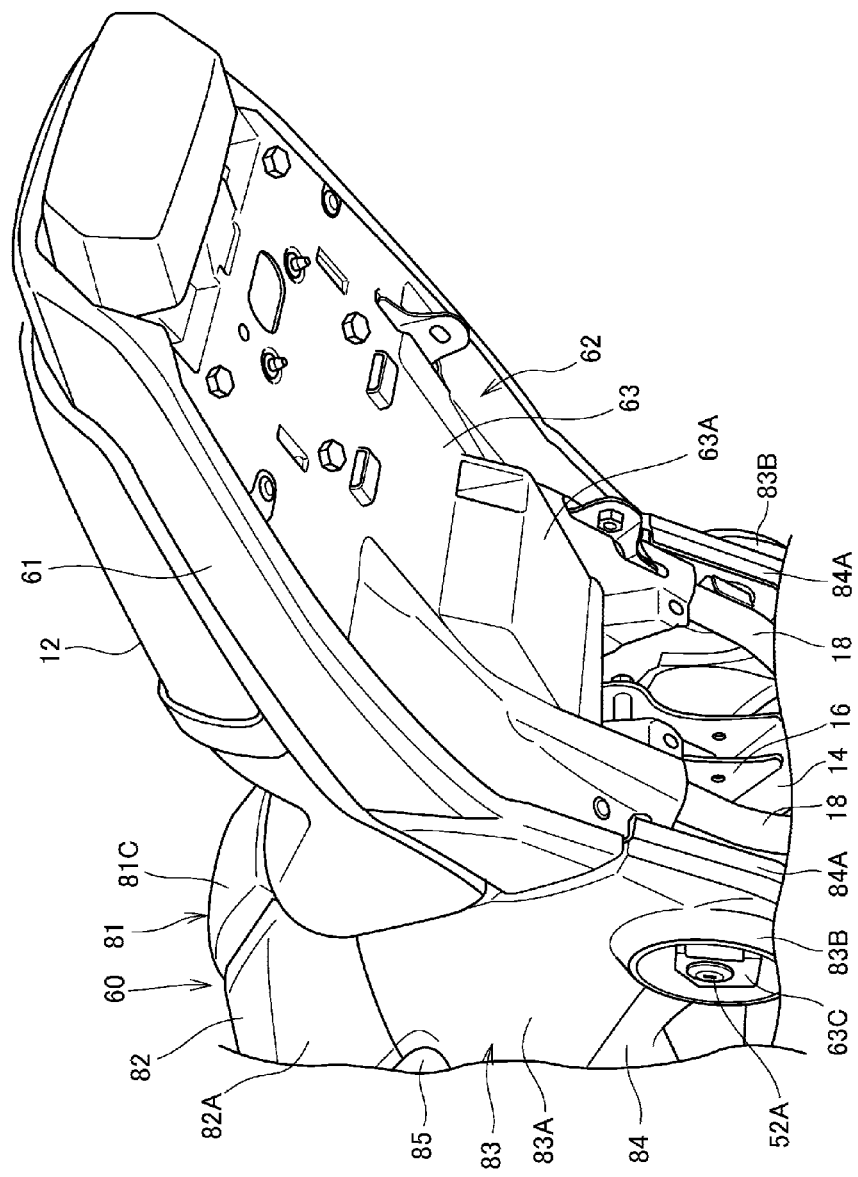
FIG. 5 is a perspective view showing the rear fender when the rear fender is viewed from the rear lower side.

FIG. 4 is a perspective view showing the securing state of the rear fender 62. FIG. 5 is a perspective view showing the rear fender 62 when the fear fender 62 is viewed from the rear lower side. FIG. 5 shows a state that the rear-side rear fender 64 is detached.

The front-side rear fender 63 is formed like a tray so that the right and left seat frames 17, 17 are covered from the lower side by a single body, and extends from the intermediate portions in the front-and-rear direction of the sub frames 18, 18 to the rear sides of the seat frames 17, 17. A battery container 63A in which a battery (not shown) for the vehicle is accommodated is formed at the front portion of the front-side rear fender 63.

A seat catcher 50 of a seat lock mechanism (seat lock) for locking the seat 12 under a close state is provided to the rear cross member 22 at the rear portions of the seat frames 17, 17. A hook portion (not shown) projecting downwards is provided to the rear portion of the seat 12, and the hook portion is hooked to the seat catcher 50, whereby the seat 12 is set to a lock state (locked state). The lock state of the seat 12 is released by operating a key cylinder 52 connected to the seat catcher 50 through an operating wire 51. When a main key of the vehicle or the like is inserted into the key cylinder 52 and turn the key cylinder 52, the locked seat catcher 50 is unlocked.

A cylinder mount portion 63B extending frontwards and downwards is integrally formed at the front end of one side (left side) in the vehicle width direction of the front-side rear fender 63. The cylinder mount portion 63B is formed in a box-like shape which is opened at the upper surface thereof, and it extends forwards along the outer side surface of the left-side seat frame 17 and is located at the side of the upper portion of the left-side center frame 15.

The key cylinder 52 is supported in the cylinder mount portion 63B, and the key cylinder 52 is disposed to face the outside in the vehicle width direction of a key insertion port 52A. A cylinder support portion 63C for supporting the key cylinder 52 spreads from the cylinder mount portion 63B outwards in the vehicle width direction.

Figure 6:
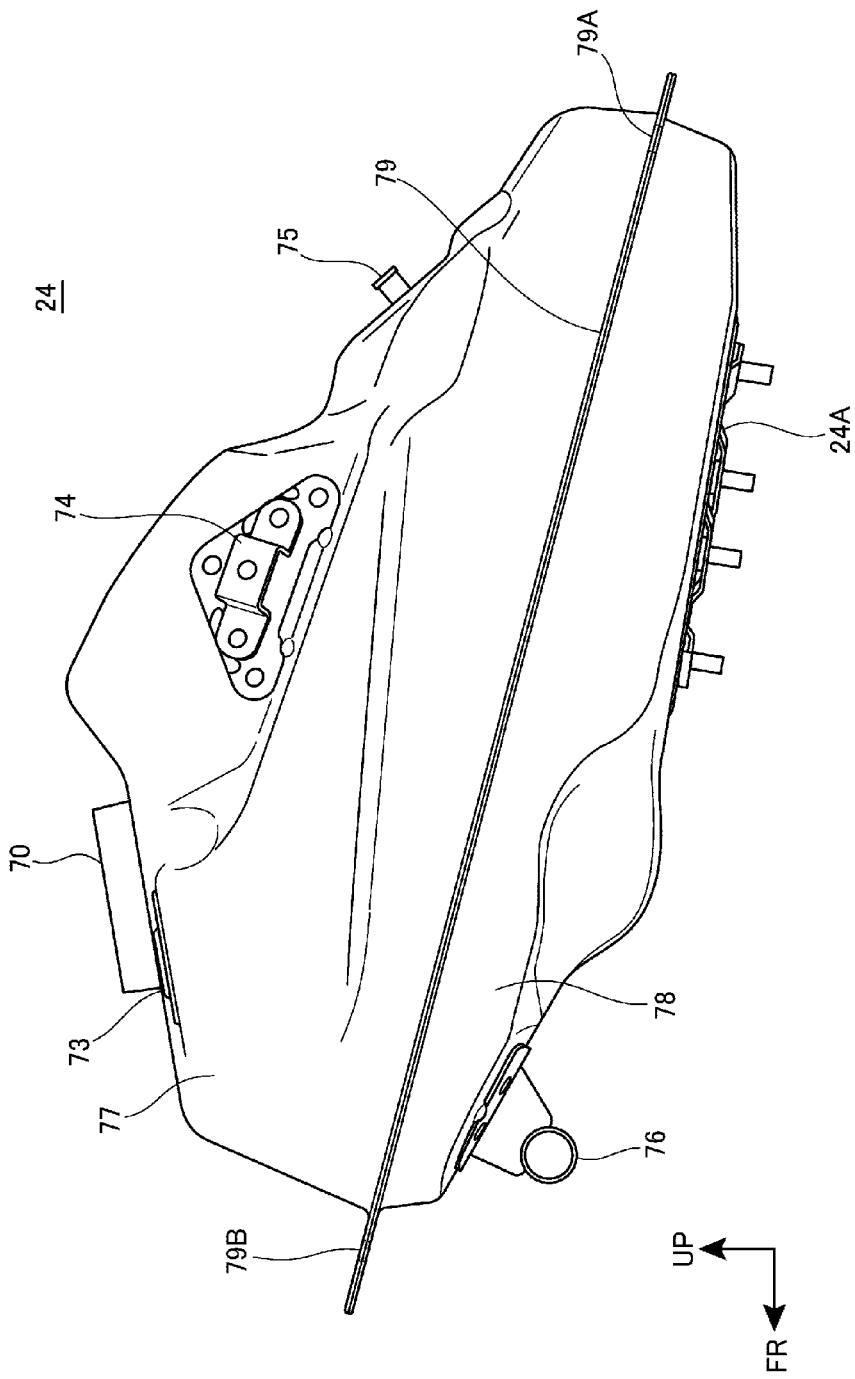
FIG. 6 is a left side view of a fuel tank.
Figure 7:
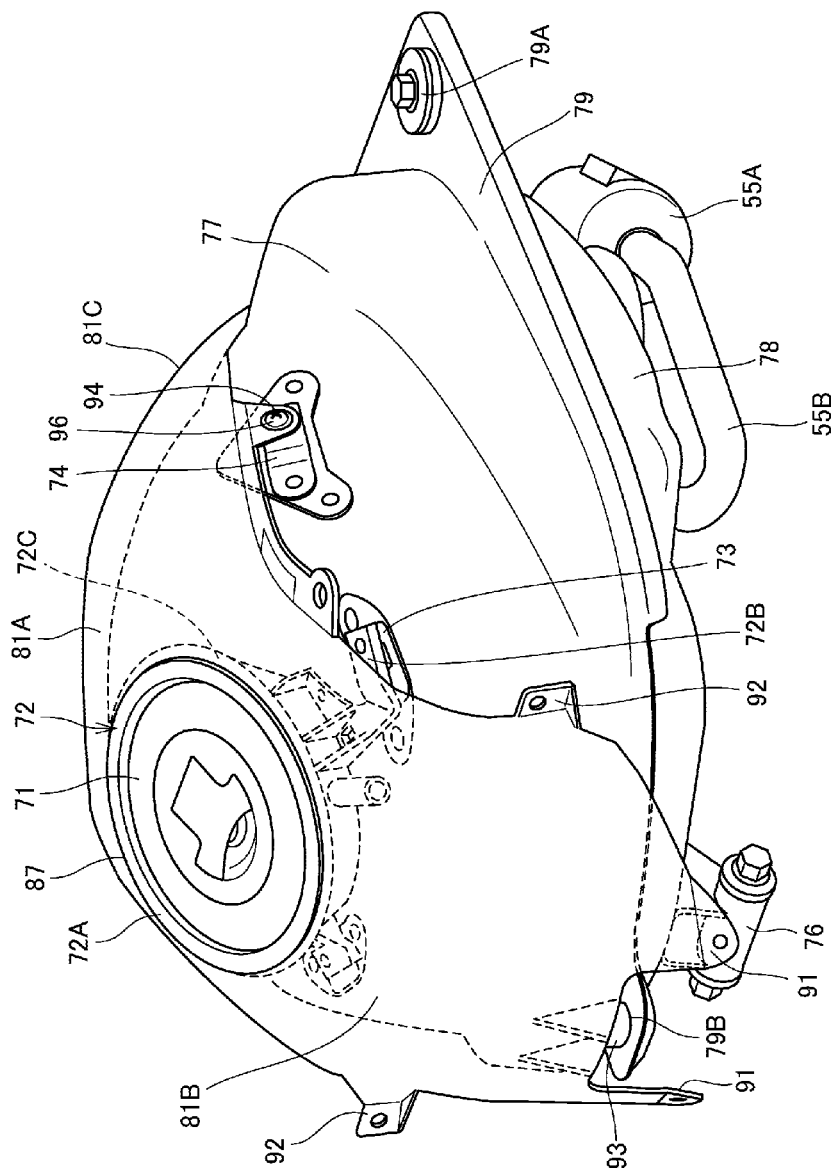
FIG. 7 is a perspective view showing the fuel tank.

FIG. 6 is a left-side view showing the fuel tank 24. FIG. 7 is a perspective view showing the fuel tank 24. FIG. 7 shows a state that a part of the vehicle body cover C is secured.

The fuel tank 24 is a box-shaped tank containing a fuel pump 55 (FIG. 11) for supplying the engine 30 with fuel. The upper surface of the fuel tank 24 is designed to be highest at the center portion thereof in the up-and-down direction and inclined downwards to the front and rear sides thereof.

A fuel filler opening 70 is provided at the center in the vehicle width direction of the upper surface of the front portion of the fuel tank 24. The fuel filler opening 70 is designed in a cylindrical shape, and the upper portion thereof projects upwards from the upper surface of the fuel tank 24. The fuel filler opening 70 is blocked by a fuel filler opening cap 71 so as to be freely opened and closed. A ring member 72 (securing ring) is fitted in the cylindrical fuel filler opening 70 so as to surround the upper portion of the fuel filler opening 70 from the outer peripheral side thereof. The ring member 72 has a cylinder portion 72A fitted to the fuel filler opening 70, and stay portions 72B, 72B (the stay portion 72B at the right side is not shown) extending outwards from the cylinder portion 72A to the right and left sides. The rigidity of the periphery of the fuel filler opening 70 is enhanced by the ring member 72.

Stays 73, 73 (the stay 73 at the right side is not shown) to which the stay portions 72B, 72B of the ring member are fastened are provided to the right and left sides of the fuel feeler opening 70 on the upper surface of the fuel tank 24. Cover fixing stays 74, 74 (the cover fixing stay 74 at the right side is not shown) to which the tank cover 60 is fixed are provided to the right and left side surfaces at the rear side of the fuel feeler opening 70 of the upper portion of the fuel tank 24. A fitting projecting portion 75 to which a fitting portion (not shown) provided to the lower surface of the front end of the seat 12 is fitted is provided to the rear portion of the fuel tank 24.

A front stay 76 fastened to the front-side tank stay 14A of the main frame 14 is provided to the lower surface of the front portion of the fuel tank 24 so as to project downwards. A pump fixing hole portion 24A in which the fuel pump 55 is inserted and to which the fuel pump 55 is fixed is provided to the lower surface of the rear portion of the fuel tank 24.

The fuel tank 24 is designed in a box-like shape by joining an upper half body 77 constituting an upper portion and a lower half body 78 constituting a lower portion, and a flange portion 79 serving as a joint portion between the upper half body 77 and the lower half body 78 is formed at the side surface portion of the fuel tank 24 so as to make a circuit of the side surface direction and the upper and lower parts are joined to each other at the flange portion 79 of the side surface portion, whereby the fuel tank 24 can be easily manufactured. Rear portion fixing portions 79A which are fastened to the rear-side tank stays 17A of the seat frames 17, 17 are provided to the rear portion of the flange portion 79. A hook hole portion 79B to which the tank cover 60 is fixed is formed at the flange portion 79 at the front end of the fuel tank 24. The flange portion 79 is covered by the tank cover 60, so that the vehicle can be made excellent in appearance although the fuel tank 24 can be easily manufactured by providing the flange portion 79.

As shown in FIG. 2, the front portion of the fuel tank 24 is fixed to the main frame 14 through the front-side tank stays 14A, the rear portion of the fuel tank 24 is fixed to the seat frames 17, 17 above the suspension bracket 16 through the rear portion fixing portion 79A while floated from the upper surface of the man frame 14, and a space is formed between the rear portion and the upper surface of the main frame 14. A fuel filter 55A of the fuel pump 55 is disposed in this space. The fuel filter 55A is formed in a cylindrical shape, and connected to the lower portion of the fuel pump 55 by a pair of fuel hoses 55B.

Figure 8:
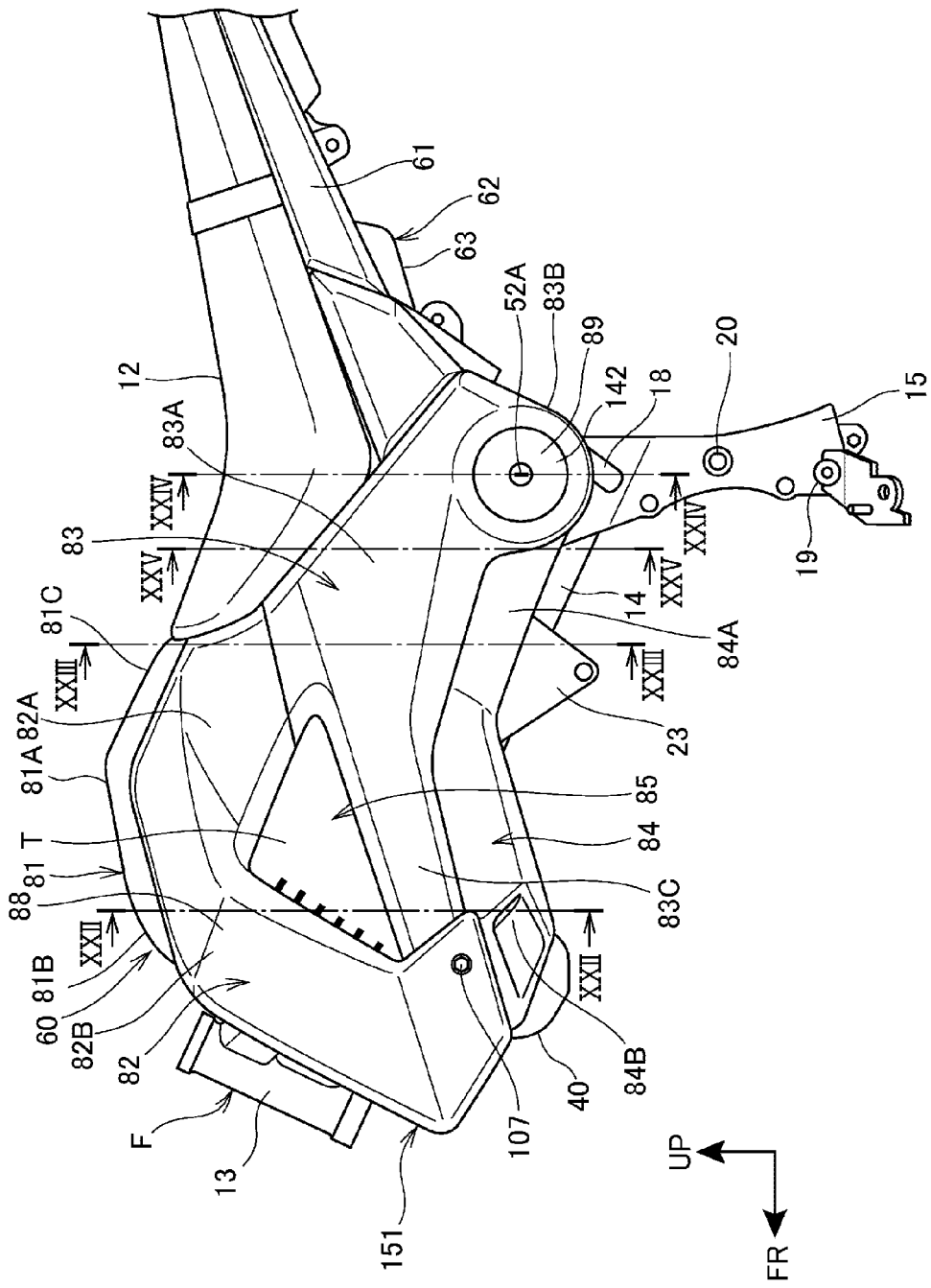
FIG. 8 is a left-side view showing a fixing state of a tank cover.
Figure 9:
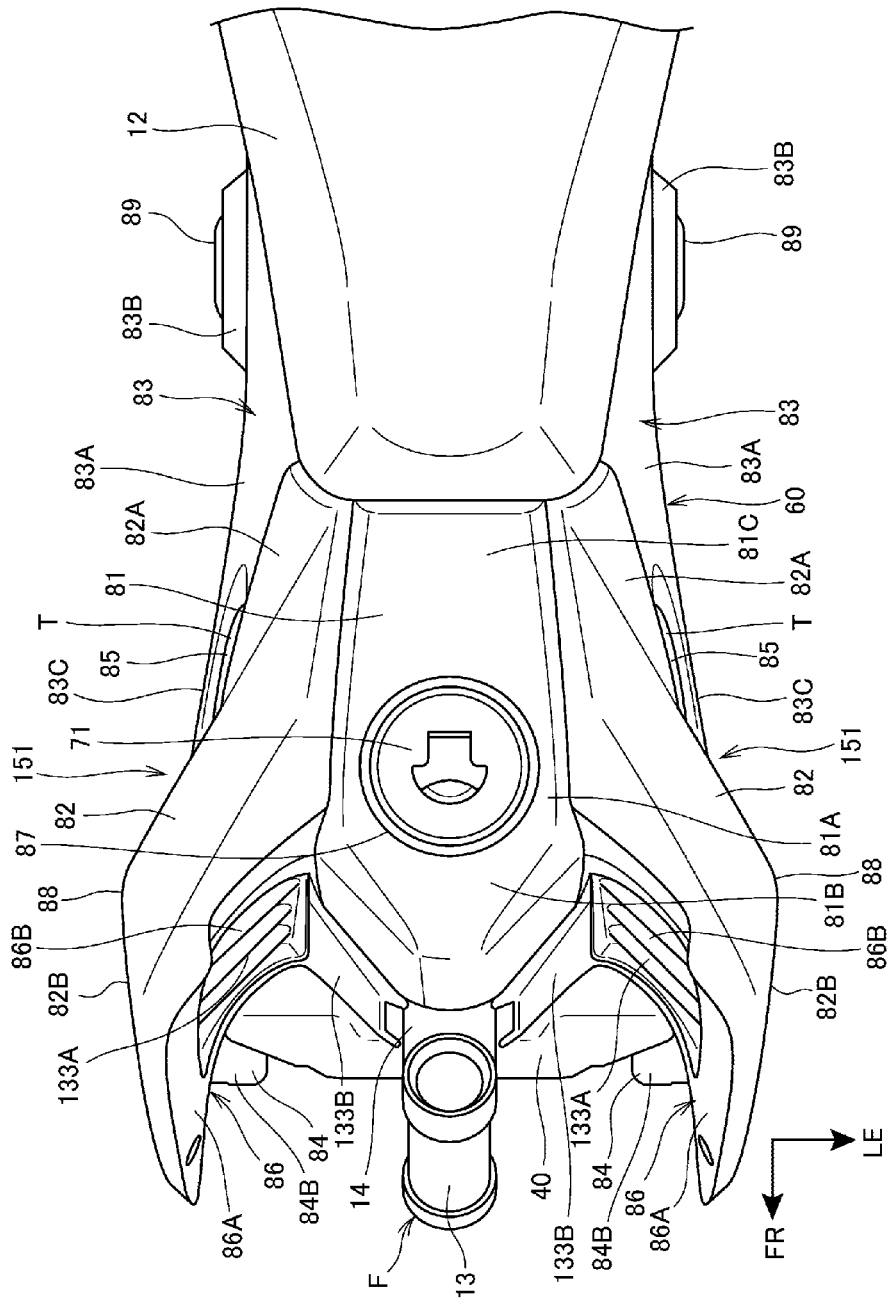
FIG. 9 is a plan view showing the fixing state of the tank cover when the tank cover is viewed from the upper side.
Figure 10:
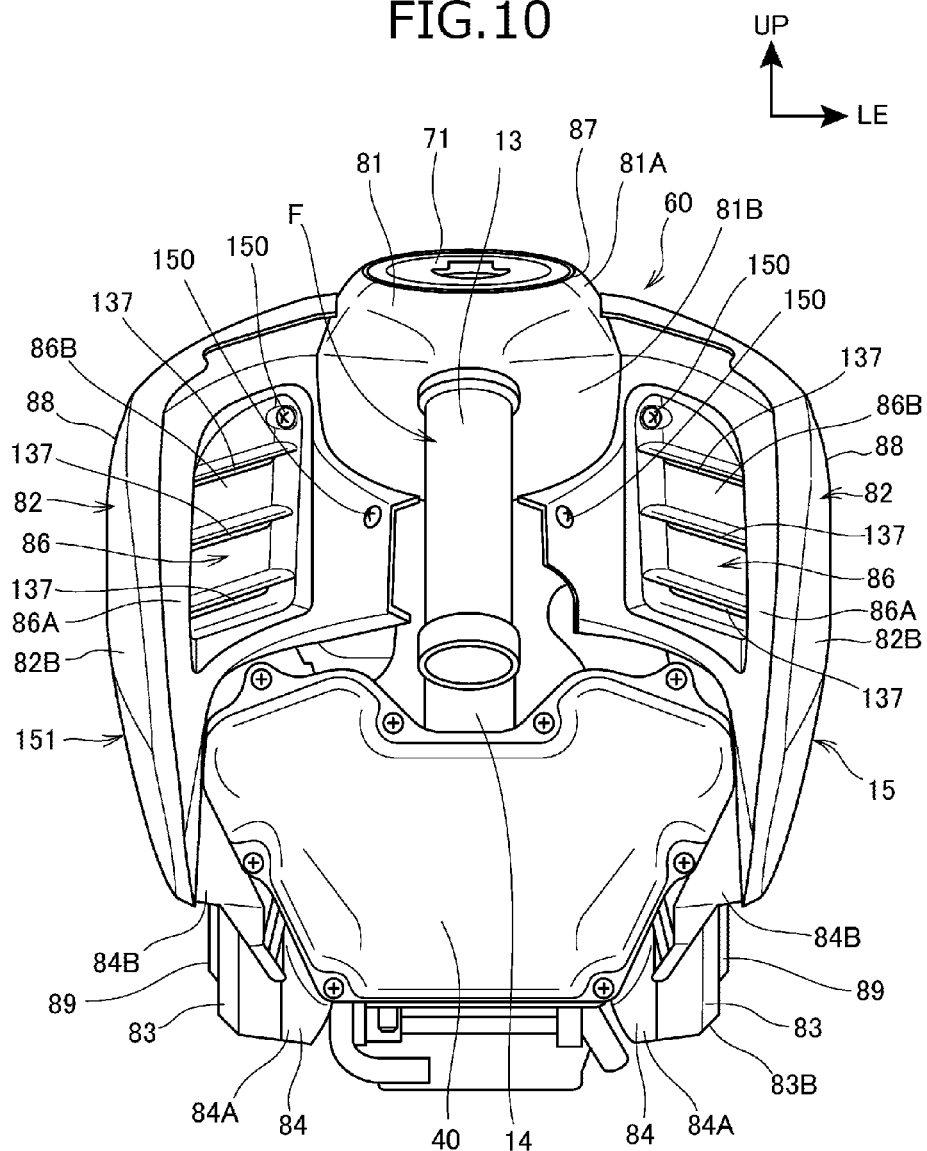
FIG. 10 is a front view showing the fixing state of the tank cover when the tank cover is viewed from the front side.
Figure 11:
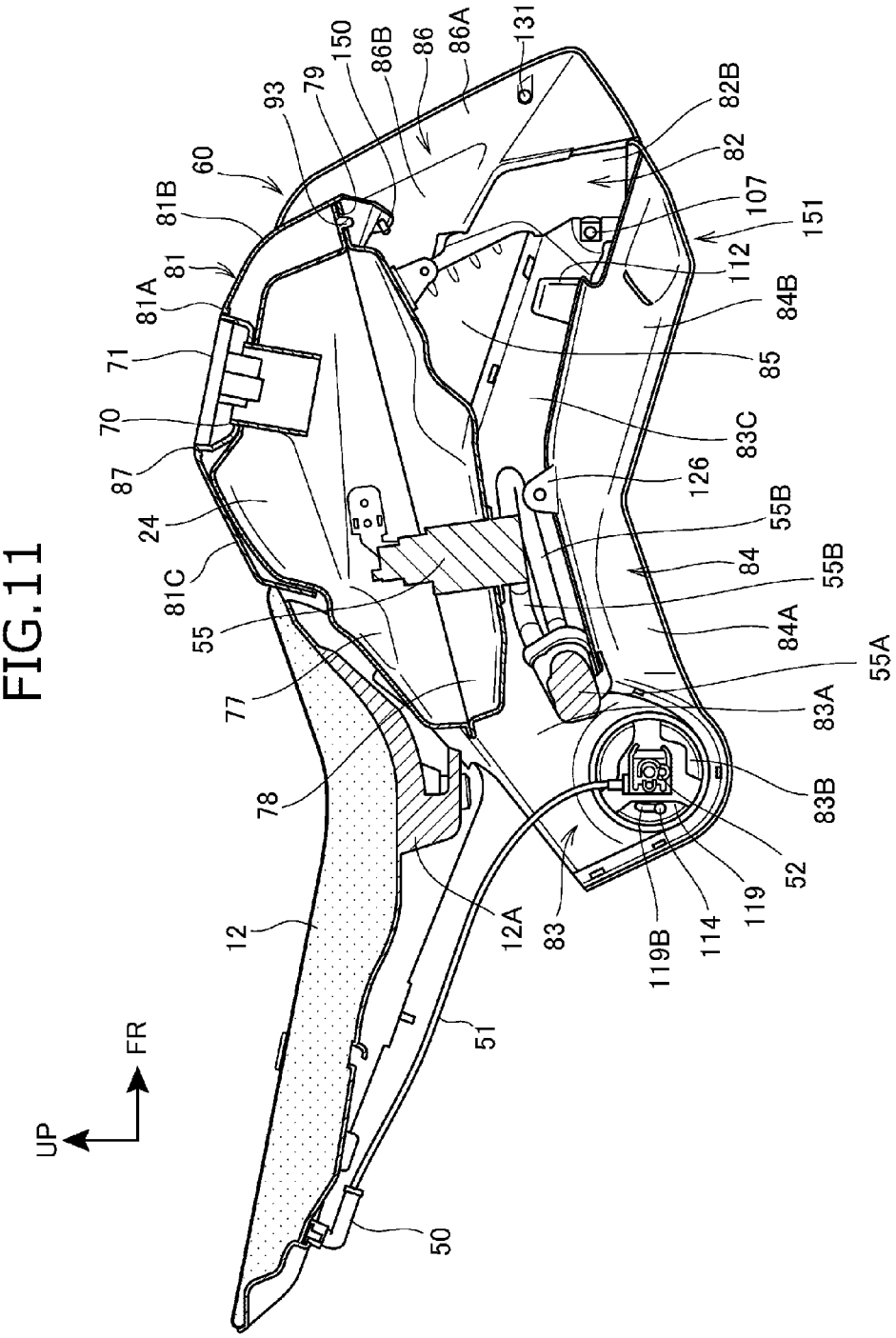
FIG. 11 is a view showing the fixing state of the tank cover when the tank cover is viewed from the inside.

FIG. 8 is a left side view showing the attachment state of the tank cover 60. FIG. 9 is a plan view of the attachment state of the tank cover 60 which is taken from the upper side. FIG. 10 is a front view of the attachment state of the tank cover 60 which is taken from the front side. FIG. 11 is a view of the attachment state of the tank cover 60 which is viewed from the inside.

As shown in FIG. 2 and FIGS. 8 to 11, the tank cover 60 is a large-size cover which covers from the rear portion of the head pipe 13 to the lower side of the front portion of the seat 12 in the front-and-rear direction and also covers from the lower portion of the main frame 14 to the upper surface of the fuel tank 24.

The tank cover 60 is configured to have a top cover 81 covering the upper surface of the fuel tank 24, front covers 82 covering the side surfaces of the front portion of the fuel tank 24 and the side surfaces of the front portion of the main frame 14, rear covers 83 covering the side surfaces of the rear portion of the fuel tank 24, the fuel filter 55A, the intermediate portion of the main frame 14, the suspension bracket 16 and the upper portion of the center frame 15, lower covers 84 covering the air cleaner box 40 and the rear portion of the main frame 14, center covers 85 covering the lower portion of the fuel tank 24 and the front portion of the main frame 14, and inner covers 86 covering the fuel tank 24 from the front side thereof. The top cover 81 is a single cover. The front covers 82, the rear covers 83, the lower covers 84, the center covers 85 and the inner covers 86 are respectively provided in the form of right-and-left pairs so as to cover the right and left side surfaces of the vehicle. These covers are formed substantially symmetrically in the right-and-left direction. Accordingly, the tank cover 60 which covers the left side surface of the vehicle will be described hereunder in detail.

The top cover 81 is provided at the center in the vehicle width direction, and extends from the rear side of the head pipe 13 to the front edge of the seat 12 to cover the upper surface of the fuel tank 24. The top cover 81 has an upper surface portion 81A covering the periphery of the fuel filler opening cap 71, a front upper surface portion 81B extending from the upper surface portion 81A to the front lower side along the shape of the fuel tank 24, and a rear upper surface portion 81C extending from the upper surface portion 81A to the rear lower side along the shape of the fuel tank 24. A circular opening 87 through which the fuel filler opening cap 71 is exposed to the upper side is formed in the upper surface portion 81A.

The front cover 82 has front cover upper portions 82A which are joined to the side edge portion of the top cover 81 and cover the fuel tank 24 from the sides thereof, and wide-width portions 82B which extend frontwards and downwards from the side portions of the fuel filler opening cap 71 at the front cover upper portion 82A to the sides of the upper portion of the air cleaner box 40. The front cover upper portions 82A are provided so as to slope and expand outwards in the vehicle width direction in top view as it slopes downwards. The wide-width portion 82B extends frontwards while expanding outwards in the vehicle width direction from the front portion of the front cover upper portion 82A, and has a swelling portion 88 protruding most greatly in the vehicle width direction at the side of the front edge of the fuel tank 24, and is designed to narrow in the vehicle width direction at the front side of the swelling portion 88 as it extends frontwards. The swelling portion 88 is a portion which is widest at the outside in the vehicle width direction. By providing the swelling portion 88, a part of traveling wind from the front side can be interrupted, and the traveling wind can be suppressed from directly impinging against the occupant's knee region.

The rear cover 83 has a knee grip portion 83 which is located below the rear portion of the front cover upper portion 82A of the front cover 82 and the front portion of the seat 12 to cover the rear portion of the fuel tank 24, a lower extension portion 83B which extends downwards from the knee grip portion 83A and covers the upper portion of the center frame 15, and a front extension portion 83C which extends from the knee grip portion 83A to the front lower side, covers the main frame 14 and is joined to the lower end portion of the wide-width portion 82B of the front cover 82. The front extension portion 83C extends frontward and downwards while being away from the lower edge of the front cover upper portion 82A and the rear edge of the wide-width portion 82B to the lower side, and a space T which is substantially triangular in side view is formed among the lower edge of the front cover upper portion 82A, the rear edge of the wide-width portion 82B and the upper edge of the front extension portion 83C. The knee grip portions 83A are portions which are gripped by the knees of the occupant sitting on the seat 12 to hold the vehicle body. The lower extension portion 83B is provided to be overlapped with the cylinder mount portion 63B of the front-side rear fender 63 from the outside, and a circular garnish 89 for decoration is secured to the lower extension portion 83B so as to cover the cylinder mount portion 63B from the outside.

The center cover 85 is formed in a substantially triangular shape so that the space T is filled by the center cover 85, and covers the lower portion of the fuel tank 24 and the front portion of the main frame 14.

The lower cover 84 has a frame cover portion 84A which extends forwards from the lower extension portion 83B of the rear cover 83 along the lower edge of the knee grip portion 83A and covers the rear portion of the main frame 14, and a front lower portion cover portion 84B which extends frontwards and downwards from the frame cover portion 84A along the front extension portion 83C, connects to the lower edge of the wide-width portion 82B and covers the lower portion of the air cleaner box 40.

The inner cover 86 has an inner cover portion 86A which covers the wide-width portion 82B of the front cover 82 from the inside in the vehicle width direction, and a front cover portion 86B which bends from the rear portion of the inner cover portion 86A inwards in the vehicle width direction and covers the fuel tank 24 from the front side so as to block the gap between the center frame 15 and the front cover 82. The lower end of the front cover portion 86B is located above the air cleaner 40, and the upper end of the front cover portion 86B is continuous with the upper edge portion of the wide-width portion 82B.

Figure 12:
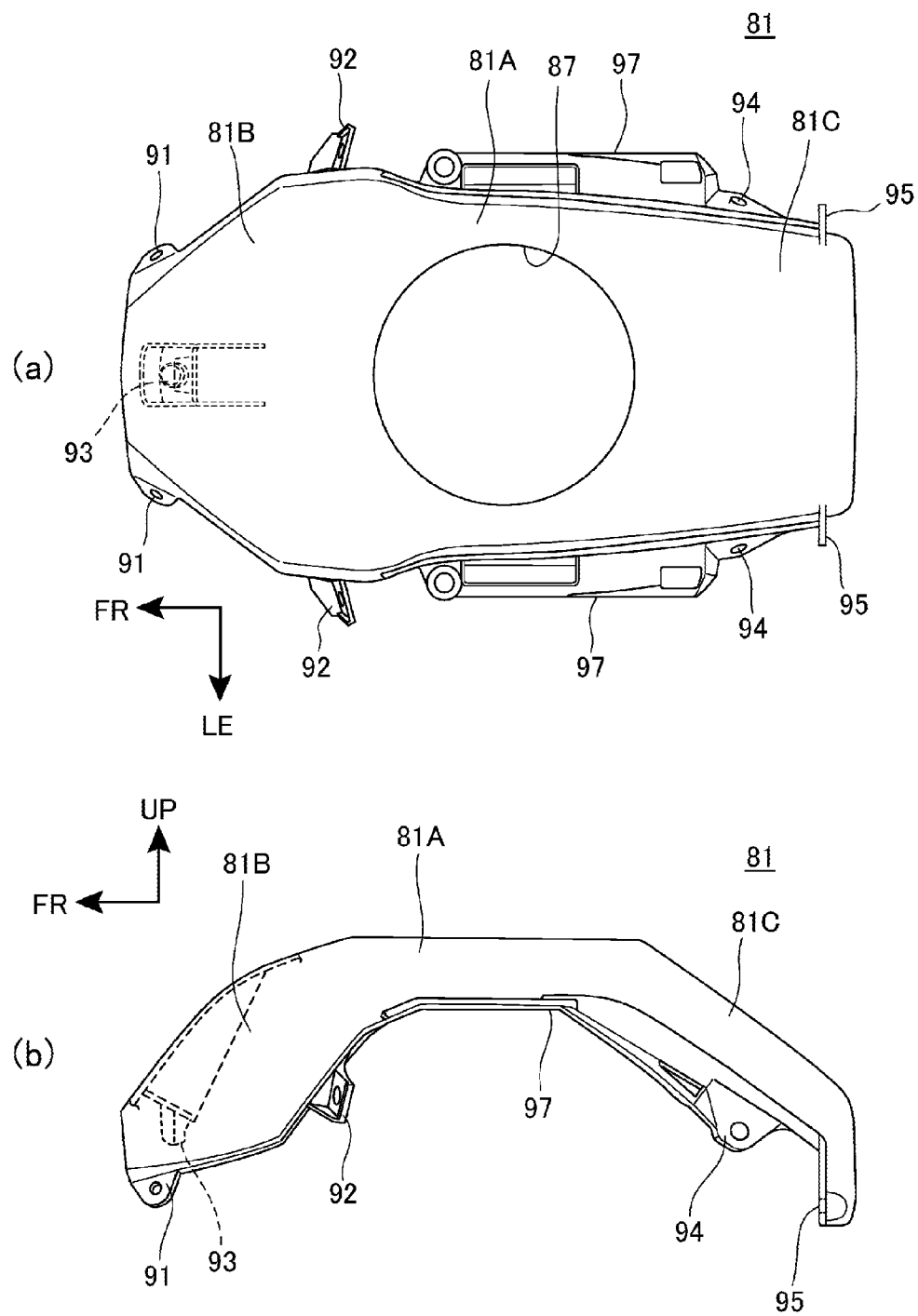

FIG. 12 is a diagram showing the top cover 81, FIG. 12(a) is a plan view and FIG. 12(b) is a side view.

As shown in FIG. 12, fixing portions 91, 91 and fixing portions 92, 92 which project outwards in the vehicle width direction are provided at the side edge portions of the front portion and rear portion of the front upper surface portion 81B of the top cover 81. The top cover 81 is joined to the front cover portion 86B (FIG. 10) of the inner cover 86 through the fixing portions 91, 91 and the fixing portions 92, 92.

Fixing portions 95, 95 to which the front cover upper portions 82A of the front covers 82 are joined are provided at the side edge portions of the rear ends of the rear upper surface portion 81C of the top cover 81.

Plate-like hook portions 97, 97 extending outwards in the vehicle width direction are provided at the side edge portions of the upper surface portion 81A of the top cover 81.

A hook projection portion 93 projecting downwards is formed at the center in the vehicle width direction of the front portion of the top cover 81. Cover fixing portions 94, 94 projecting downwards are formed at the side edge portions of the rear upper surface portion 81C of the top cover 81. As shown in FIG. 7, the hook projection portion 93 is hooked to the hook hole portion 79B of the flange portion 79 of the fuel tank 24 from the upper side and the cover fixing portions 94, 94 are fastened to the cover fixing stays 74, 74 by screws 96, 96, whereby the top cover 81 is fixed to the fuel tank 24. Furthermore, under the state that the top cover 81 is fixed to the fuel tank 24, the opening 87 is fitted to the outer peripheral surface of the ring member 72, whereby the top cover 81 is also supported by the fuel tank 24. Therefore, the top cover 81 can be surely fixed to the fuel tank 24. A step portion 72C is formed at the outer peripheral portion of the upper surface of the cylinder portion 72A of the ring member 72, and the peripheral edge portion of the opening 87 is received from the lower side by the step portion 72C, whereby the top cover 81 are located substantially on the same plane as the fuel filler opening cap 71 and the ring member 72, and also surely fitted to the ring member 72.

Figure 13:
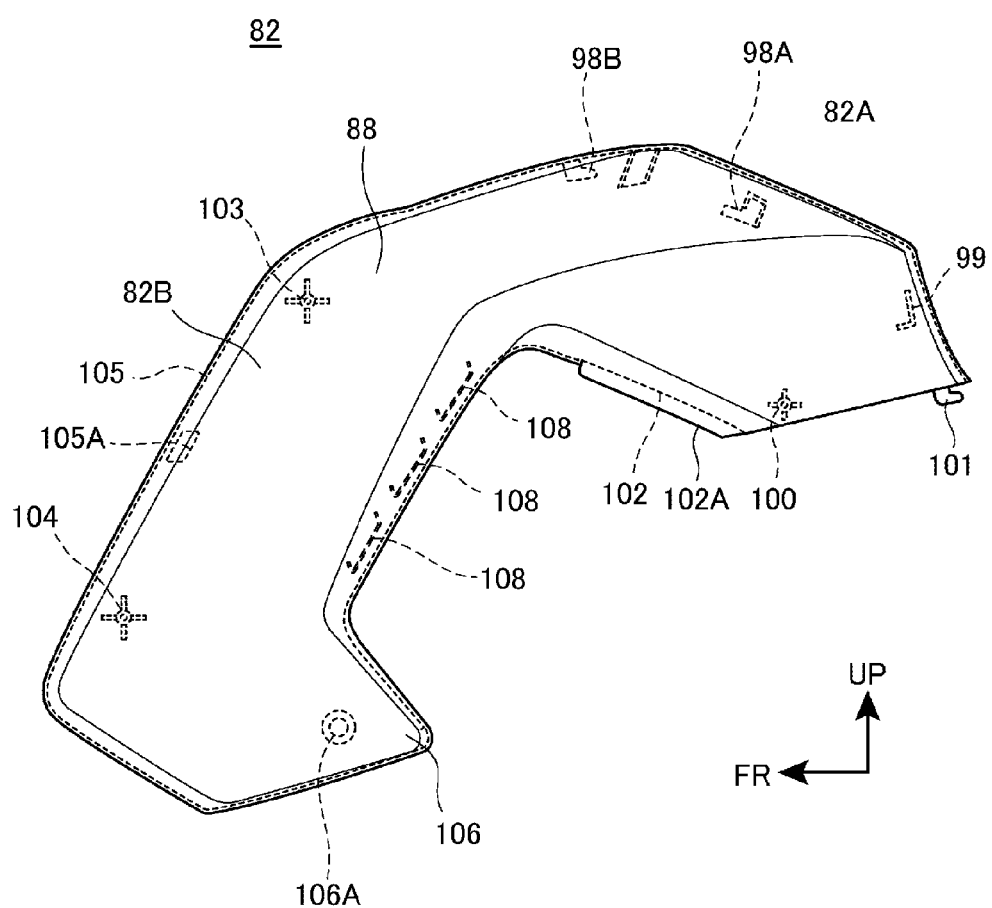
FIG. 13 is a side view showing a front cover.
Figure 14:
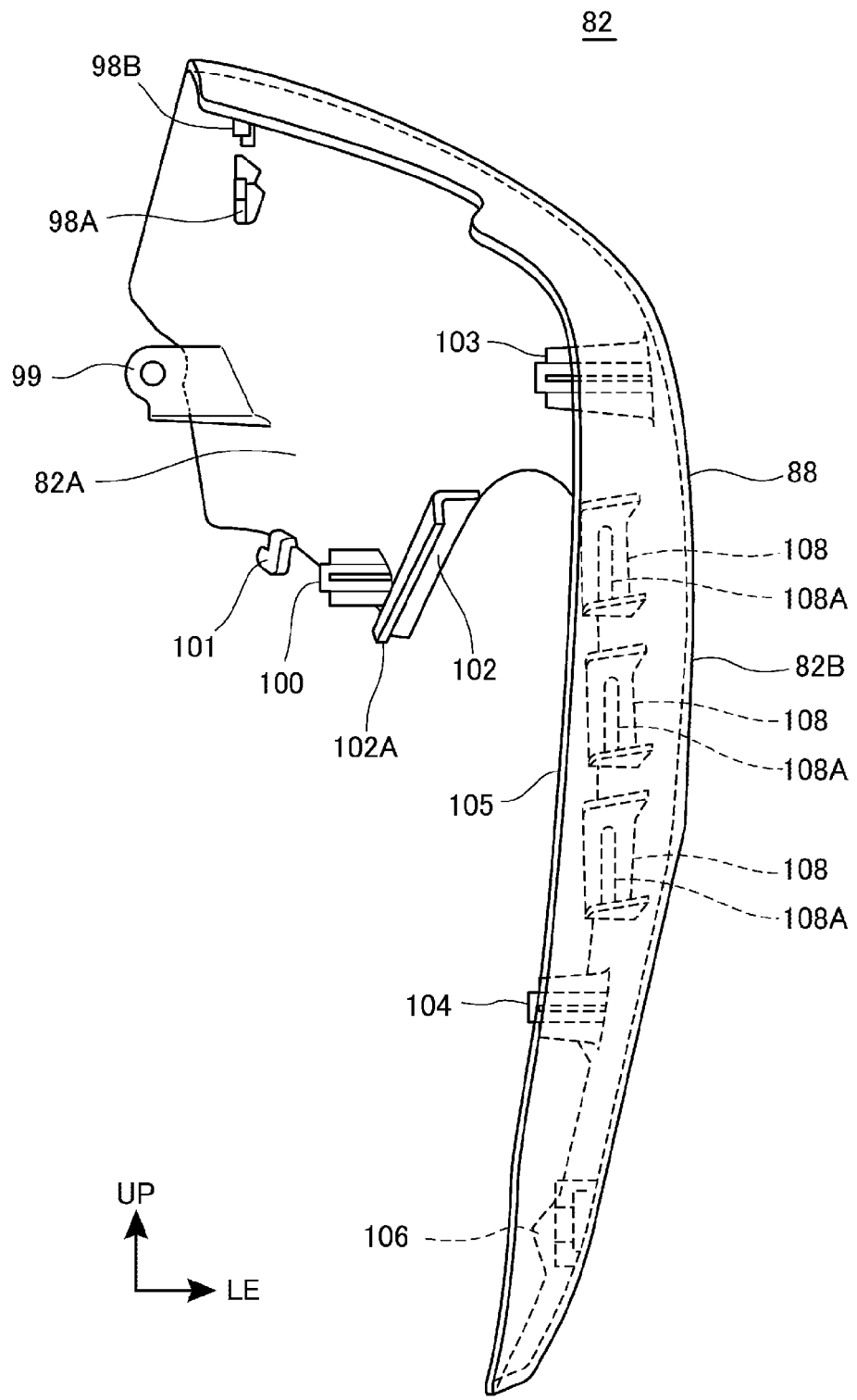
FIG. 14 is a diagram showing the front cover when the front cover is viewed from the front side.

FIG. 13 is a side view showing the front cover 82, and FIG. 14 is a view of the front cover 82 which is taken from the front side.

As shown in FIGS. 13 and 14, hook projections 98A, 98B projecting downwards are provided to the upper portion of the front cover upper portion 82A of the front cover 82. A plate-like fixing portion 99 projecting inwards in the vehicle width direction is formed at the rear portion of the front cover upper portion 82A. The hook projection 98A is hooked to the hole portion of the hook portion 97 (FIG. 12) and the fixing portion 99 is fastened to the fixing portion 95 (FIG. 12) with a screw or the like, whereby the front cover 82 is fixed to the top cover 81.

A boss portion 100 projecting inwards in the vehicle width direction is formed at the lower portion of the front cover upper portion 82A of the front cover 82. A hook projection 101 projecting downwards is formed at the lower edge of the rear portion of the front cover upper portion 82A.

A plate-like hook portion 102 extending inwards in the vehicle width direction is provided at the lower edge of the front portion of the front cover upper portion 82A. A wall portion 102A projecting downwards is formed at the inner end portion of the hook portion 102.

Boss portions 103, 104 projecting inwards in the vehicle width direction are formed at the upper and lower portions of the front portion of the wide-width portion 82B of the front cover 82. A rib 105 extending inwards in the vehicle width direction is formed at the front edge of the wide-width portion 82B so as to be continuous from the upper end of the wide-width portion to the lower end thereof along the front edge. In the rib 105, a hook projection 105A projecting rearwards is formed at an intermediate portion in the up-and-down direction between the boss portions 103 and 104.

An extension portion 106 extending rearwards is formed at the lower portion of the wide-width portion 82B, and a fixing portion 106A to which the rear cover 83 is connected is provided to the extension portion 106. The fixing portion 106A is a hole in which a screw 107 (FIG. 8) for joining the front cover 82 and the rear cover 83 is inserted from the outside.

Plural hook portions 108 projecting inwards in the vehicle width direction are provided to the rear portion of the wide portion 82B so as to be arranged in the up-and-down direction. The hook portion 108 has a hook hole 108A opening rearwards.

Figure 15:
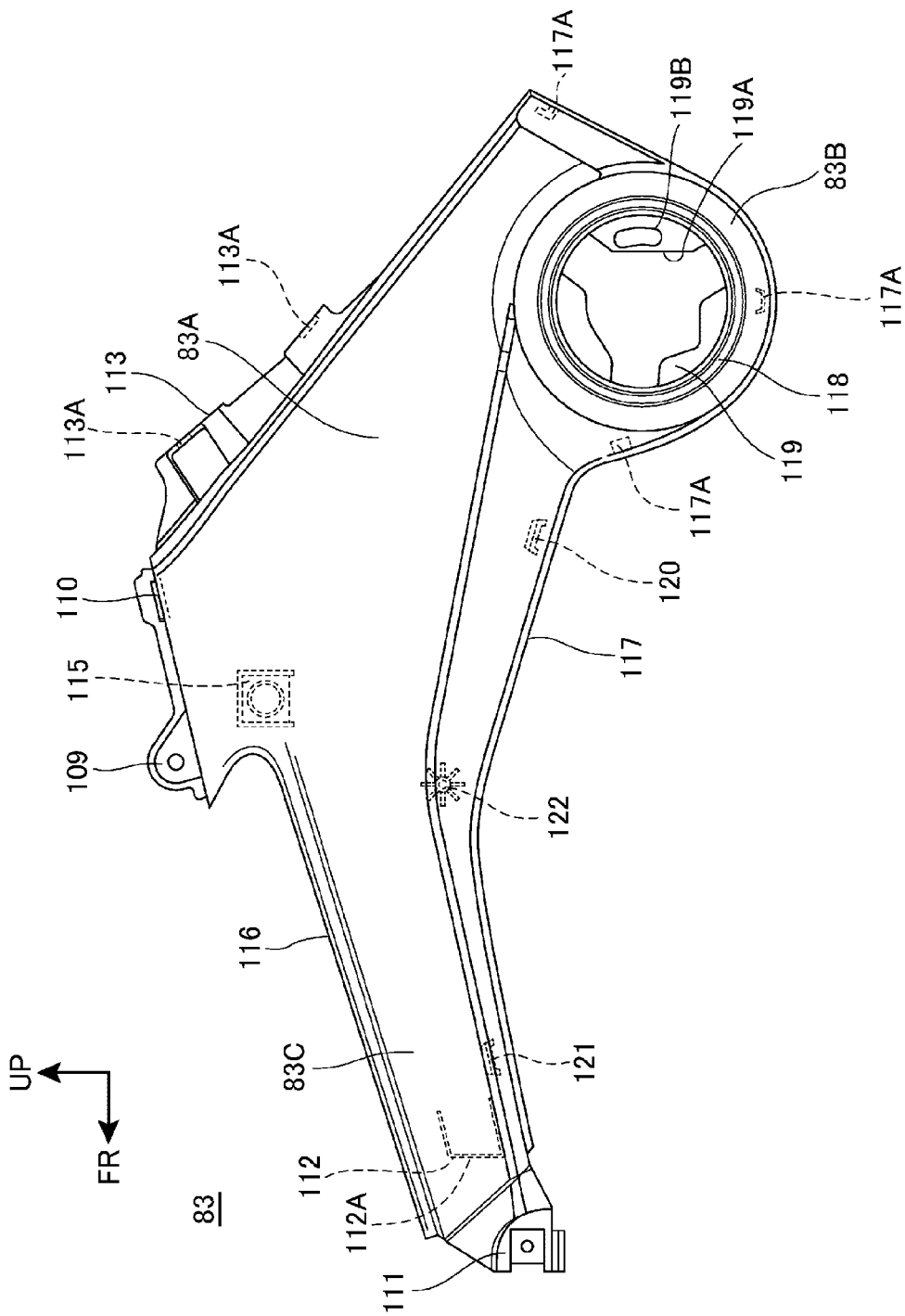
FIG. 15 is a side view of a rear cover.
Figure 16:
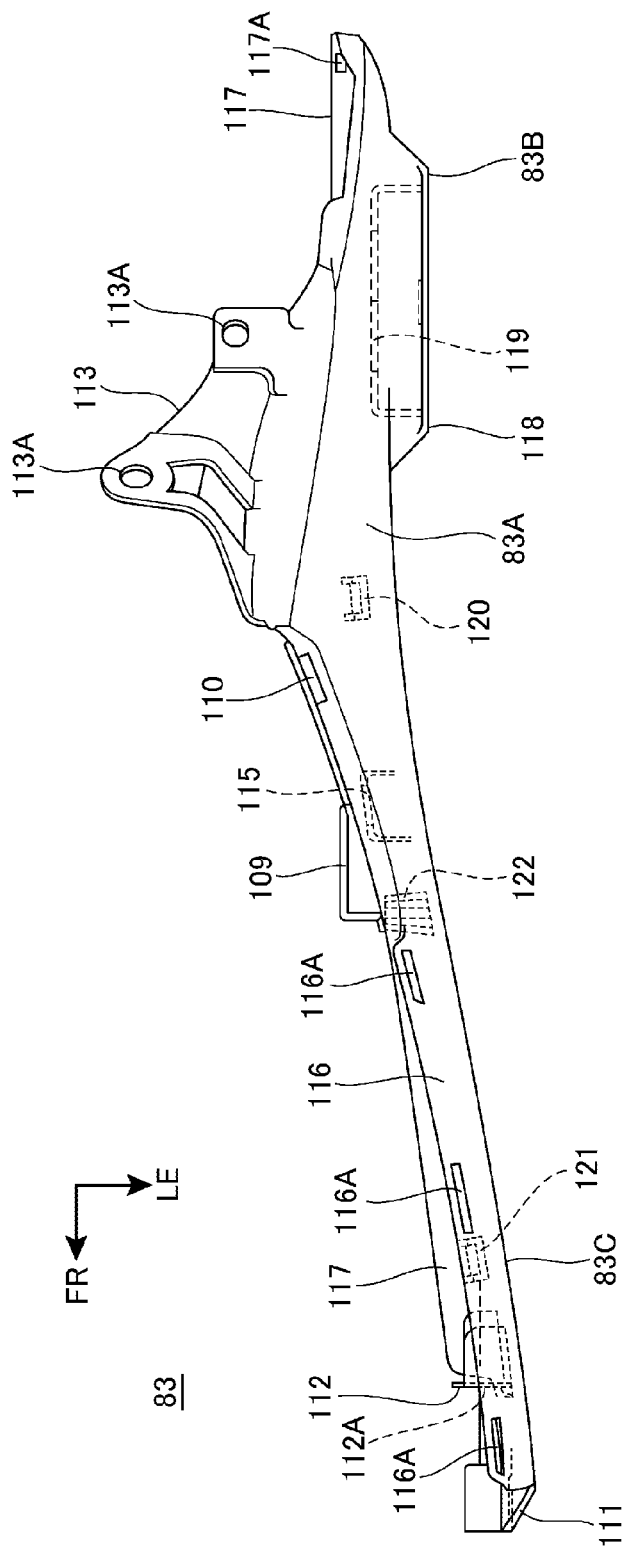
FIG. 16 is a plan view of the rear cover when the rear cover is viewed from the upper side.

FIG. 15 is a side view of the rear cover 83. FIG. 16 is a plan view of the rear cover 83 which is viewed from the upper side.

As shown in FIGS. 15 and 16, a fixing portion 109 projecting upwards and a hook portion 110 opening upwards at the rear side of the fixing portion 109 are formed at the upper edge of the front portion of the knee grip portion 83A of the rear cover 83. A front-end fixing portion 111 which is overlapped with the extension portion 106 of the front cover 82 from the inside is formed at the front end of the front extension portion 83C of the rear cover 83. The front-end fixing portion 111 is fastened to the fixing portion 106A (FIG. 13) by a screw 107, the hook portion 110 is hooked to the hook projection 101 (FIG. 13), and the fixing portion 109 is fastened to the boss portion 100 (FIG. 13) by a screw (not shown) inserted from the inside, whereby the rear cover 83 is fixed to the front cover 82.

A stay portion 112 extending inwards in the vehicle width direction is formed at the front portion of the front extension portion 83C of the rear cover 83, and the stay portion 112 has a fitting portion 112A opening frontwards. The fitting portion 112A of the stay portion 112 is fitted to the fitting portion 40C (FIG. 2) of the air cleaner box 40, whereby the rear cover 83 is supported by the vehicle body through the air cleaner box 40.

The rear cover 83 has an upper plate portion 113 extending inwards in the vehicle width direction from the upper edge of the rear portion of the knee grip portion 83A, and support hole portions 113A, 113A to which elastic members 114 (FIG. 25) such as rubber or the like are secured are provided to the upper plate portion 113. Under the state that the upper plate portion 113 is secured to the vehicle body, the upper plate portion 113 is pinched between the front portion of the seat 12 and the upper surface of the rear portion of the fuel tank 24.

A stay portion 115 projecting inwards to the fuel tank 24 side is secured to the front portion of the knee grip portion 83A, and an attachment member (not shown) formed of an elastic member such as rubber or the like is secured to the end of the stay portion 115. The rear cover 83 abuts against the side surface of the fuel tank 24 through the attachment member under the state that the rear cover 83 is secured to the vehicle body.

An upper edge rib 116 projecting inwards in the vehicle width direction is formed at the upper portion of the front extension portion 83C along the upper edge, and plural hook portions 116A opening upwards are provided to the upper edge rib 116 to be arranged in the front-and-rear direction.

The lower extension portion 83B is designed to be substantially circular and large to the extent that it covers the upper portion of the center frame 15 in side view. A lower edge rib 117 projecting inwards in the vehicle width direction from the lower edge of the knee grip portion 83A and the lower extension portion 83B is formed at the lower edge of the rear cover 83. Plural hook portions 117A are provided to the lower edge 117 of the lower extension portion 83B formed in an arcuate shape.

The lower extension portion 83B has a swelling portion 118 which protrudes outwards in the vehicle width direction with respect to the knee grip portion 83A, and the protrusion portion 118 has a substantially circular recess portion 119 which is recessed inwards in the vehicle width direction from the outer surface of the protrusion portion 118. An opening portion 119A in which a cylinder support portion 63C (FIG. 5) of the front-side rear fender 63 is fitted is formed in the bottom surface of the recess portion 119, and when the rear cover 83 is secured to the vehicle body, the cylinder support portion 63C is exposed to the outside through the opening portion 119A. A hole 119B in which a screw 144 (FIG. 11) for fixing the garnish 89 is inserted is formed in the bottom surface of the recess portion 119. The cylinder support portion 63C is covered and hidden from the outside by the garnish 89.

A hook portion 120 to which the lower cover 84 is connected is provided to the inner surface of the lower portion of the knee grip portion 83A. A hook portion 121 to which the lower cover 84 is connected is provided to the lower portion of the front portion of the front extension portion 83C. A boss portion 122 projecting inwards in the vehicle width direction is formed at the rear portion of the front extension portion 83C.

Figure 17:
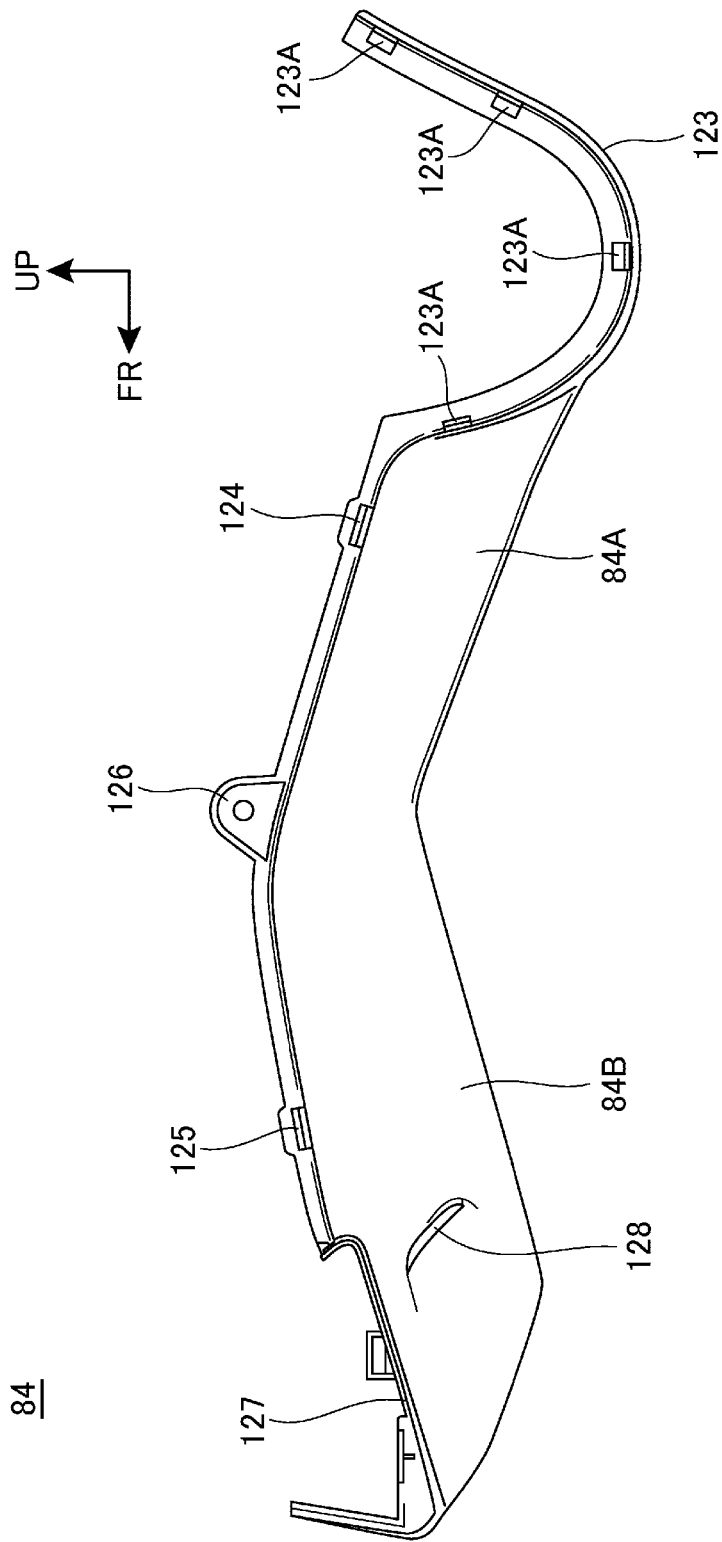
FIG. 17 is a side view of a lower cover.

FIG. 17 is a side view of the lower cover 84.

As shown in FIG. 17, a bent portion 123 which is bent arcuately along the lower edge rib 117 (FIG. 15) of the lower extension portion 83B of the rear cover 83 is formed at the rear portion of the frame cover portion 84A of the lower cover 84, and plural hook projections 123A which are fitted to the respective hook portions 117A are formed on the inner peripheral portion of the bent portion 123.

Hook projections 124, 125 which are fitted to the hook portions 120, 121 of the rear cover 83 are provided to the upper edge portions of the frame cover portion 84A and the front lower cover portion 84B of the lower cover 84. A fixing portion 126 projecting upwards is provided to the upper edge portion of an intermediate portion in the front-and-rear direction of the lower cover 84, and the fixing portion 126 is fastened to the boss portion 122 (FIG. 15) of the rear cover 83 by a screw (not shown) inserted from the inside.

A fitting portion 127 which is fitted to the lower edge portion of the wide-width portion 82B of the front cover 82 is formed at the upper edge of the front end of the front lower cover portion 84B. A vent hole 128 for taking traveling wind into the inside of the lower cover 84 is formed at the front portion of the front lower cover portion 84B.

Figure 18:
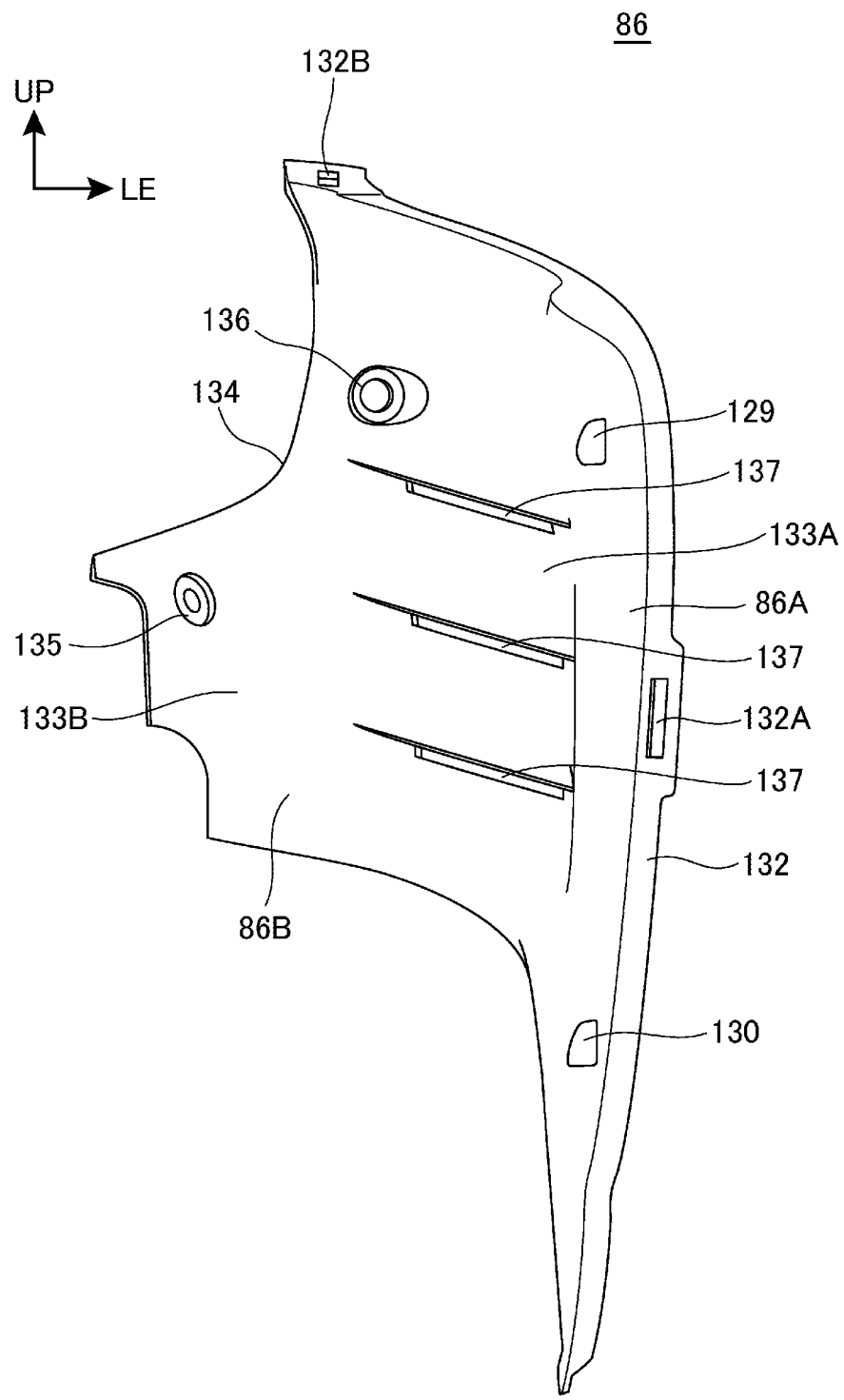
FIG. 18 is a front view of an inner cover when the inner cover is viewed from the front side.
Figure 19:
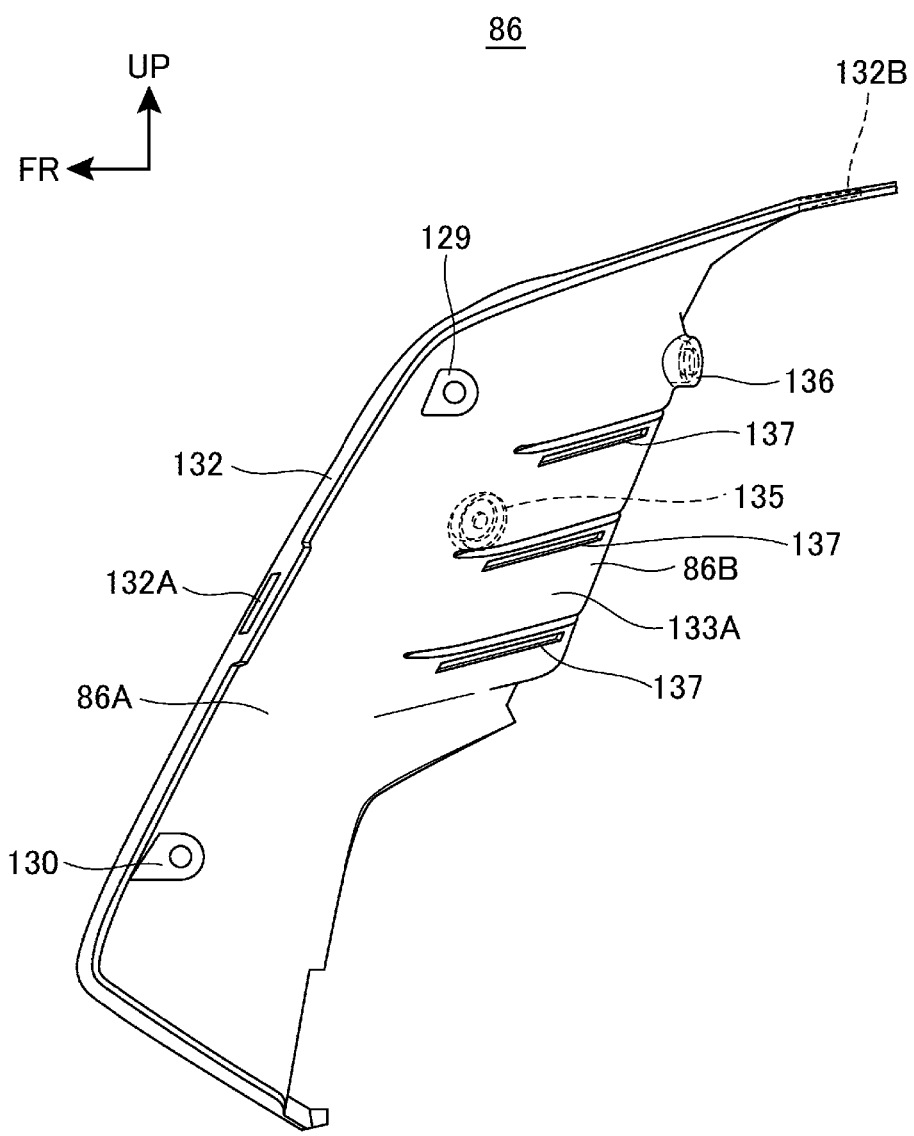
FIG. 19 is a side view of the inner cover.

FIG. 18 is a front view of the inner cover 86 which is viewed from the front side. FIG. 19 is a side view of the inner cover 86.

As shown in FIGS. 18 and 19, fixing portions 129, 130 are formed at the upper and lower portions of the front portion of the inner cover portion 86A of the inner cover 86, and the fixing portions 129, 130 are fastened to the boss portions 103, 104 (FIG. 13) by screws 131 (FIG. 11) inserted from the inside in the vehicle width direction, whereby the inner cover 86 is fixed to the front cover 82.

An outer rib 132 projecting outwards in the vehicle width direction is formed from the upper end of the inner cover 86 to the lower end thereof at the outer edge portion in the vehicle width direction of the inner cover 86. A front hook portion 132A opening in the front-and-rear direction is formed at an intermediate portion in the up-and-down direction of the outer rib 132. A rear hook portion 132B opening in the up-and-down direction is formed at the rear end of the outer rib 132. The hook projection 105A of the front cover 82 is fitted into the front hook portion 132A from the front side, and the hook projection 98B of the front cover is fitted to the rear hook portion 132B from the upper side, whereby the inner cover 86 is hooked to the front cover 82.

The front cover portion 86B of the inner cover 86 is designed to be substantially V-shaped in top view (FIG. 9), and has an outer slope portion 133A extending from the center portion in the vehicle width direction of the front cover portion 86B to the front outside in the vehicle width direction, and an inner slope portion 133B extending from the center portion in the vehicle width direction of the front cover portion 86B to the front inside in the vehicle width direction.

A cut-out portion 134 which is cut out along the shape of the side surface of the front upper surface portion 81B (FIG. 10) of the top cover 81 is formed at the upper portion of the inner slope portion 133B, and the cut-out portion 134 is fitted to the front cover portion 86B, whereby the inner cover 86 and the top cover 81 are continuous with each other. A pair of fixing portions 135, 136 are provided in the neighborhood of the edge portion of the cut-out portion 134, and screws 150, 150 (FIG. 10) inserted into the fixing portions 135, 136 from the front side are fastened to the fixing portions 91, 91, whereby the inner cover 86 is fixed to the top cover 81.

Plural slit-like ventilation ports 137 extending in the vehicle width direction are provided to the outer slope portion 133A so as to be arranged in the up-and-down direction, and the inside of the tank cover 60 is cooled by traveling wind taken from the ventilation ports 137.

In this embodiment, the front cover 82 and the top cover 81 are joined to each other in the vehicle width direction by the inner cover 86, thereby enhancing the rigidity of the tank cover 60.

Figure 20:
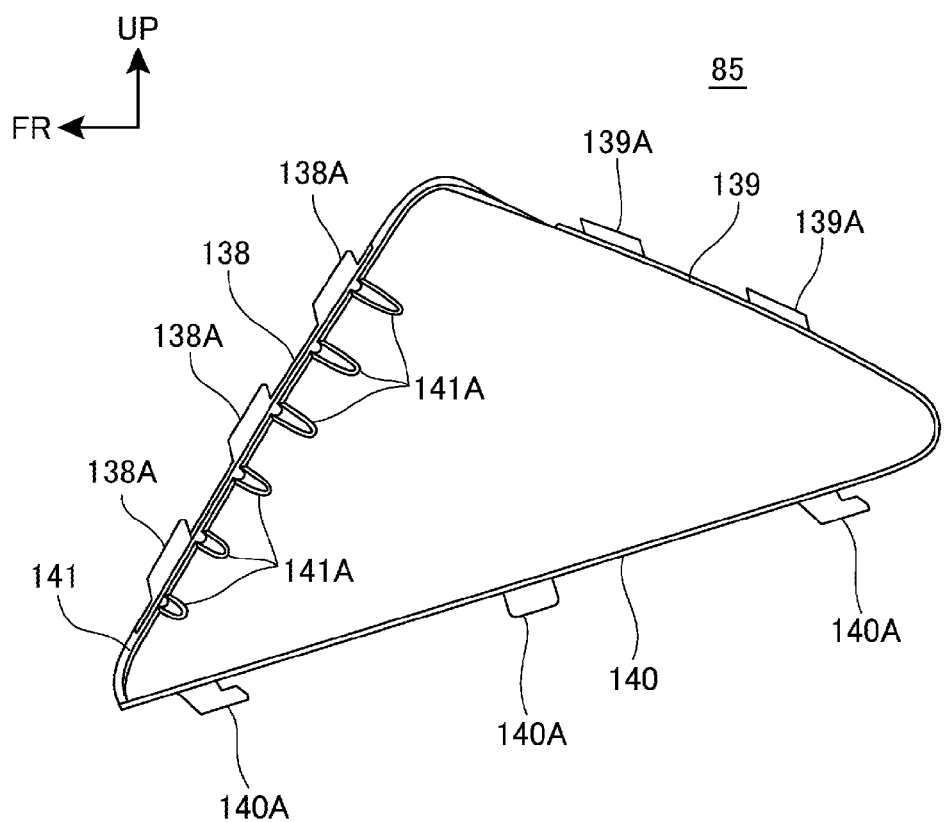
FIG. 20 is a side view of a center cover.

FIG. 20 is a side view of the center cover 85.

The center cover 85 is designed in a substantially triangular shape to have a front upper edge portion 138 extending along the rear edge portion of the wide portion 82B (FIG. 13), a rear upper edge portion 139 extending along the lower edge portion of the front portion of the front cover upper portion 82A, and a lower edge portion 140 extending along the upper edge portion of the front extension portion 83C (FIG. 15).

The center cover 85 has plural hook projections 138A projecting upwards from the front upper edge 138, plural hook projections 139A projecting upwards from the rear upper edge portion 139, and plural hook projections 140A projecting downwards from the lower edge portion 140. The respective hook projections 138A are fitted to the respective hook portions 108 (FIG. 13), the respective hook projections 139A are fitted to the hole portions of the respective hook portions 102 (FIG. 13), and the respective hook projections 140A are fitted to the respective hook portions 116A (FIG. 16), whereby the center cover 85 is fixed to the tank cover 60.

The hook projections 138A is formed at a front rib 141 which projects to the outside in the vehicle width direction at the front upper edge portion 138. Plural ribs 141A for reinforcing the front rib 141 are formed at the front upper edge portion 138.

Figure 21:
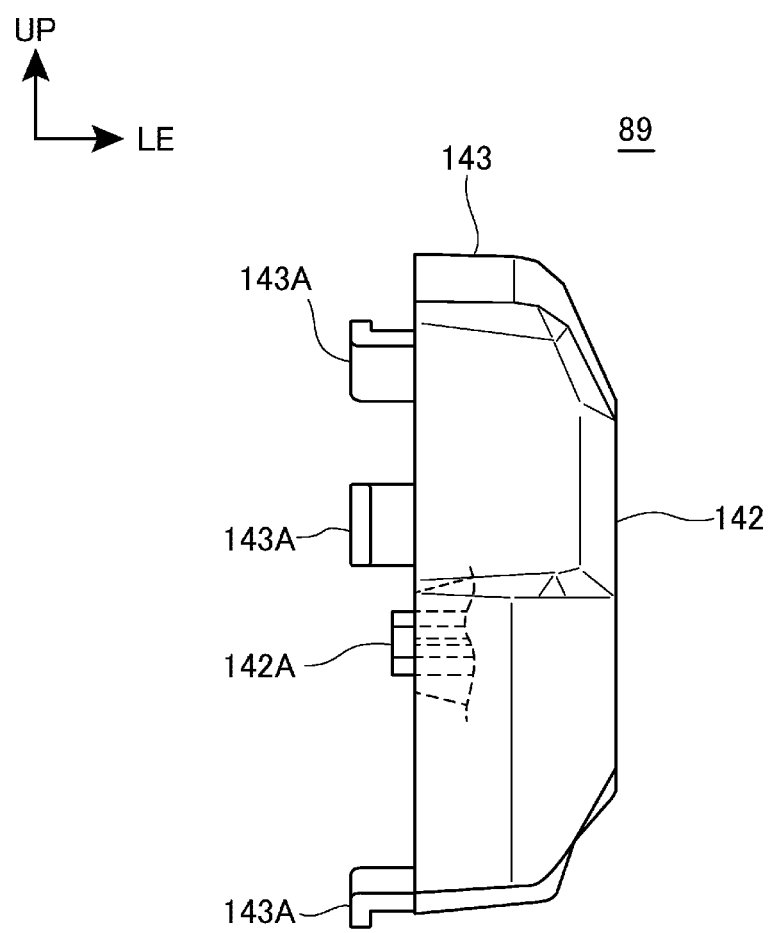
FIG. 21 is a view showing a garnish when the garnish is viewed from the front side.

FIG. 21 is a front view of the garnish 89.

As shown in FIGS. 8 and 21, the garnish 89 is designed in a dish-like shape and has a circular plate portion 142 exposed to the outside surface of the vehicle, and an outer peripheral portion 143 which is cylindrically erected from the peripheral edge portion of the circular plate portion 142. Plural pawl portions 143A which project from the tip portion of the outer peripheral portion 143 inwards in the vehicle width direction and then is bent radially outwards are formed in the garnish 89. A boss portion 142A projecting inwards in the vehicle width direction is formed at the inside of the outer peripheral portion 143 in the circular plate portion 142. A key insertion port 52A is exposed from an opening formed at the center portion of the circular plate portion 142 to the outside of the vehicle.

The outer peripheral portion 143 is fitted in the recess portion 119 (FIG. 15), each pawl portion 143A is hooked to the edge portion of the opening portion 119A of the bottom surface of the recess portion 119, and the garnish 89 is fixed to the rear cover 83 by a screw 144 (FIG. 11) which is inserted from the inside in the vehicle width direction into the hole 119B and fastened to the boss portion 142A. The cylinder mount portion 63B is also provided with a hole (not shown) in which the screw 144 can be inserted.

The tank cover 60 has a side portion cover 151 with which the front covers 82, the rear covers 83, the lower covers 84, the center covers 85 and the inner covers 86 are integrally assembled in advance. The side portion cover 151 is joined to the top cover 81 fixed to the upper surface of the fuel tank 24, etc., whereby the tank cover 60 is secured to the vehicle body. In detail, the side portion cover 151 is joined to the top cover 81 through the hook projection 98A and the fixing portion 99 of the front cover 82 and joined to the fitting portion 40C of the air cleaner box 40 through the stay portion 112 of the rear cover 83, and the upper plate portion 113 of the rear cover 83 is pinched between the front portion of the seat 12 and the fuel tank 24, whereby the side portion cover 151 is fixed to the vehicle body. In this embodiment, the side portion cover 151 is configured to be divided into plural parts, so that only a part of the cover can be independently exchanged.

Figure 22:
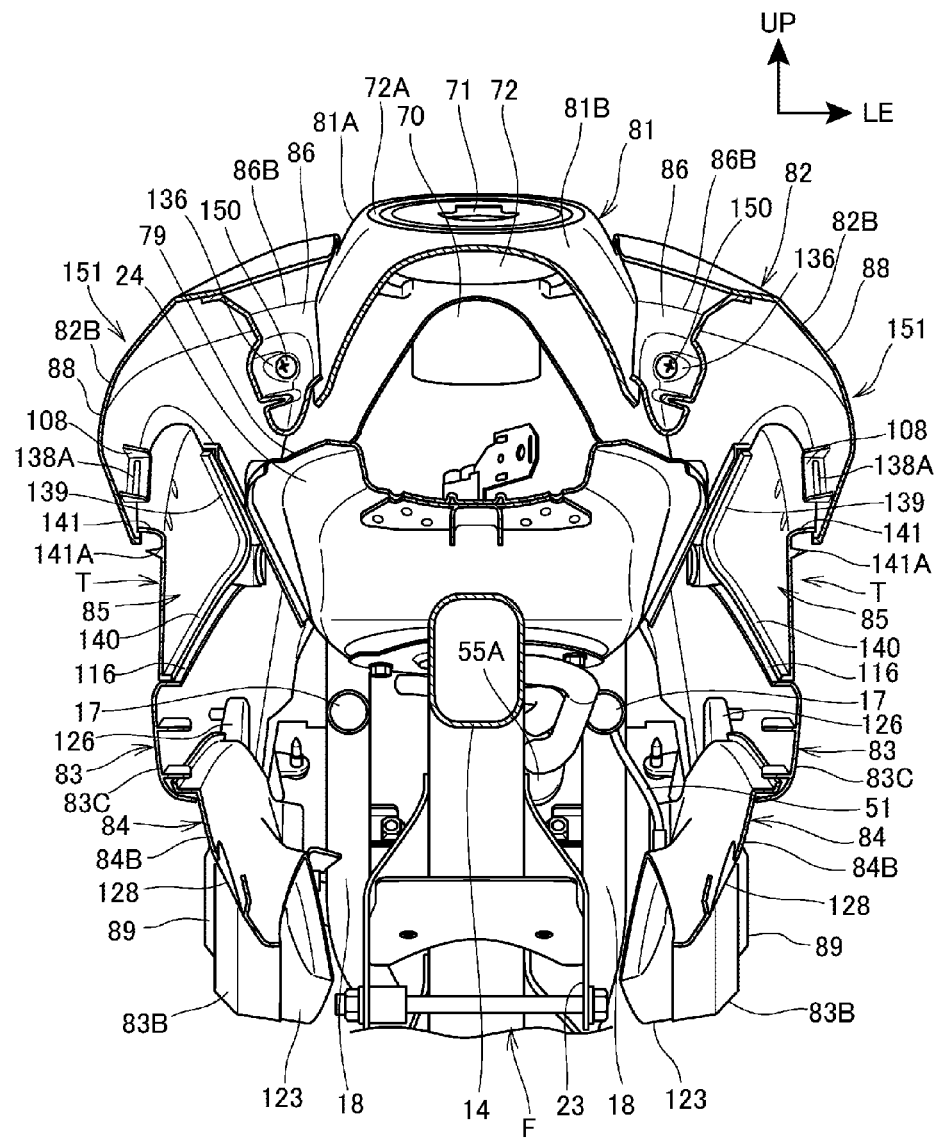
FIG. 22 is a cross-sectional view taken along XXII-XXII of FIG. 8.

FIG. 22 is a cross-sectional view taken along XXII-XXII of FIG. 8.

As shown in FIG. 22, the swelling portion 88 of the wide portion 82B of the front cover 82 most greatly protrudes outwards in the vehicle width direction at the front portion of the tank cover 60 as compared with the other portions of the tank cover 60, and the front extension portion 83C of the rear cover 83 located below the swelling portion 88 is located inside in the vehicle width direction with respect to the swelling portion 88. Furthermore, the center cover 85 located while sandwiched between the swelling portion 88 and the front extension portion 83C is located inside in the vehicle width direction with respect to the swelling portion 88 and the front extension portion 83C.

The swelling portion 88 is a portion which is apt to be damaged because it protrudes out in the vehicle width direction. However, in this embodiment, the front cover 82 having the swelling portion 88 is configure in a divided structure, and thus only the front cover 82 can be easily exchanged as occasion demands.

Furthermore, the center cover 85 is located inside in the vehicle width direction with respect to the swelling portion 88 and the front extension portion 83C, and thus it is hardly damaged or the like. In this embodiment, the center cover 85 is configured in a divided structure. Therefore, when another cover of the side cover 151 is exchanged, it is unnecessary to exchange the hardly-damaged center cover 85 together with the other cover, and thus needless exchange of a cover can be suppressed. Furthermore, the center cover 85 is supported while the whole periphery of the center cover 85 is covered by the front cover 82 and the rear cover 83. Therefore, the support stiffness of the center cover 85 can be enhanced although the center cover 85 is configured in a divided structure.

Figure 23:
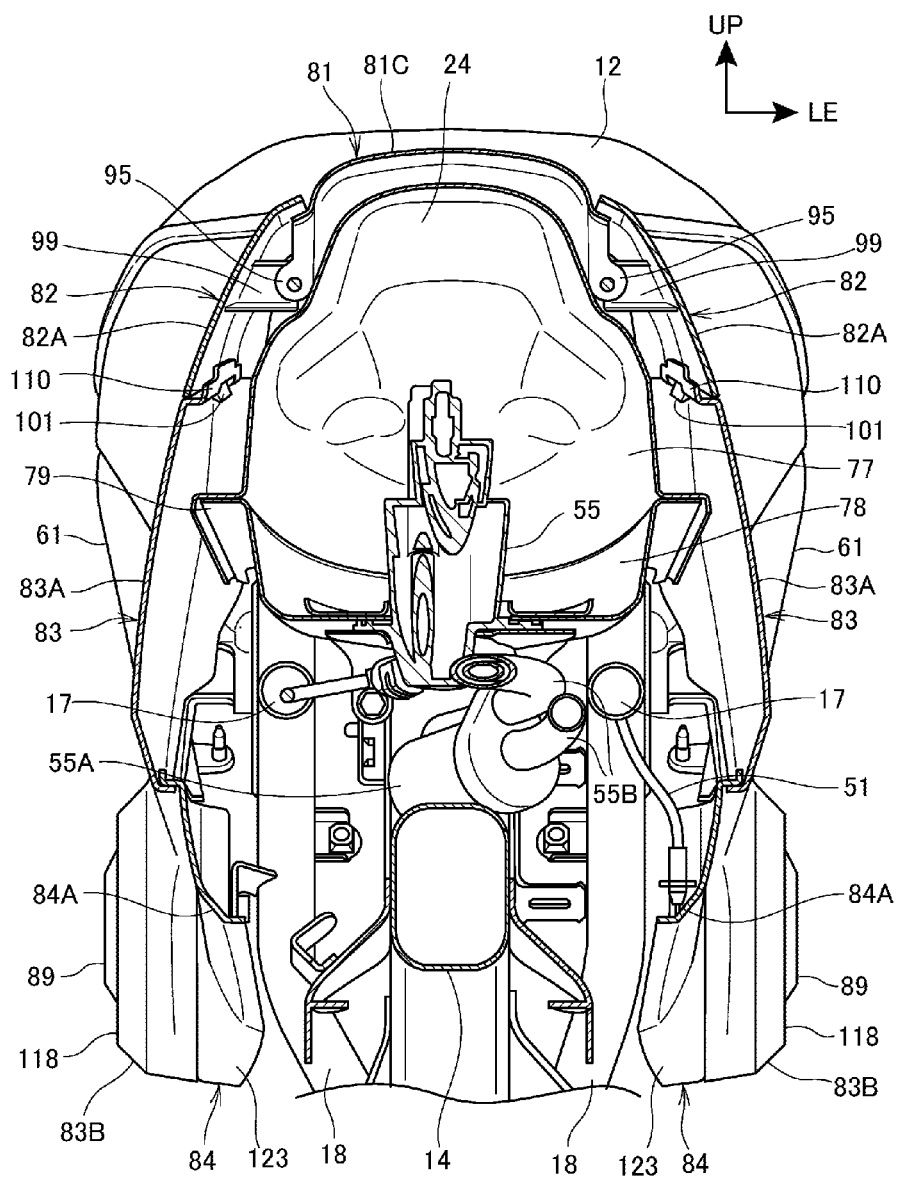
FIG. 23 is a cross-sectional view taken along XXIII-XXIII of FIG. 8.

FIG. 23 is a cross-sectional view taken along XXIII-XXIII of FIG. 8.

As shown in FIGS. 8 and 23, the knee grip portion 83A of the rear cover 83 is disposed outside in the vehicle width direction with respect to the front cover upper portion 82A above the knee grip portion 83A and the frame cover portion 84A below the knee grip portion 83A, so that the knee grip portion 83A is pinched by the knees of an occupant sitting on the seat 12 and suffers friction. In this embodiment, the rear cover 83 is divided from the other side portion cover 151. Therefore, when the knee grip portion 83A is damaged due to the friction of the occupant's knees or the like, only the rear cover 83 can be easily exchanged independently.

As shown in FIGS. 1, 22 and 23, the lower covers 84 are located above the steps 37 (FIG. 1) and near to the shoes of the occupant. Therefore, the lower covers 84 are apt to be damaged through the contact between the occupant's shoe and the lower cover 84. In this embodiment, the lower cover 84 is divided from the other side portion cover 151. Therefore, when the lower cover 84 is damaged due to the contact with the occupant's shoe, only the lower cover 84 can be easily and independently exchanged.

Figure 24:
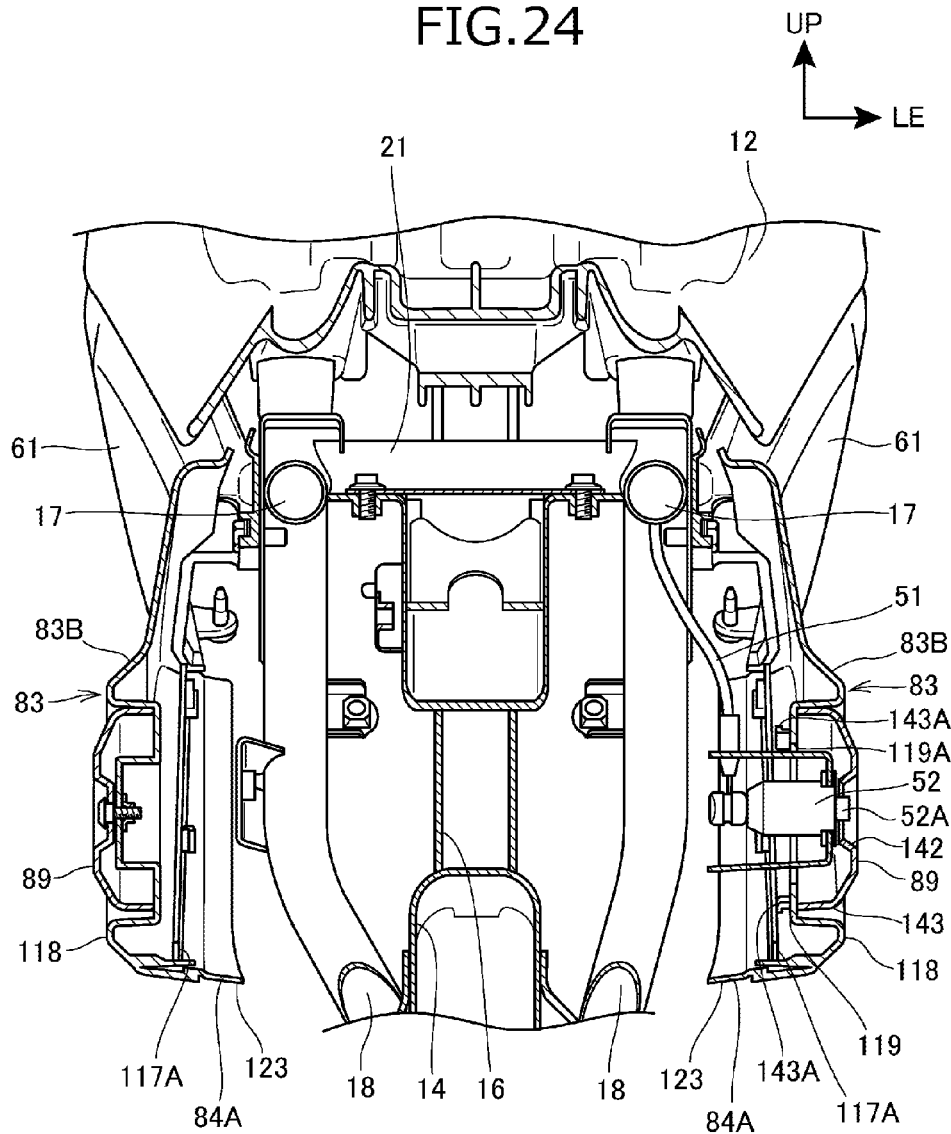
FIG. 24 is a cross-sectional view taken along XXIV-XXIV of FIG. 8.

FIG. 24 is a cross-sectional view taken along XXIV-XXIV of FIG. 8. In FIG. 24, the cylinder mount portion 63B is omitted from the illustration.

As shown in FIG. 24, the bent portion 123 of the lower cover 84 is joined to the lower extension portion 83B while overlapped with the lower extension portion 83B of the rear cover 83 from the inside in the vehicle width direction.

The key cylinder 52 is exposed from the opening portion 119A of the swelling portion 118 to the outside, and a portion thereof excluding the key insertion port 52A is covered by the garnish 89. As described above, the garnish 89 is secured to the recess portion 119 of the swelling portion 118, and the peripheral portion of the key cylinder 52 is hidden by the garnish 89, so that exterior appearance can be enhanced and the strength and rigidity of the portion provided with the key cylinder 52 can be enhanced by the garnish 89.

Figure 25:
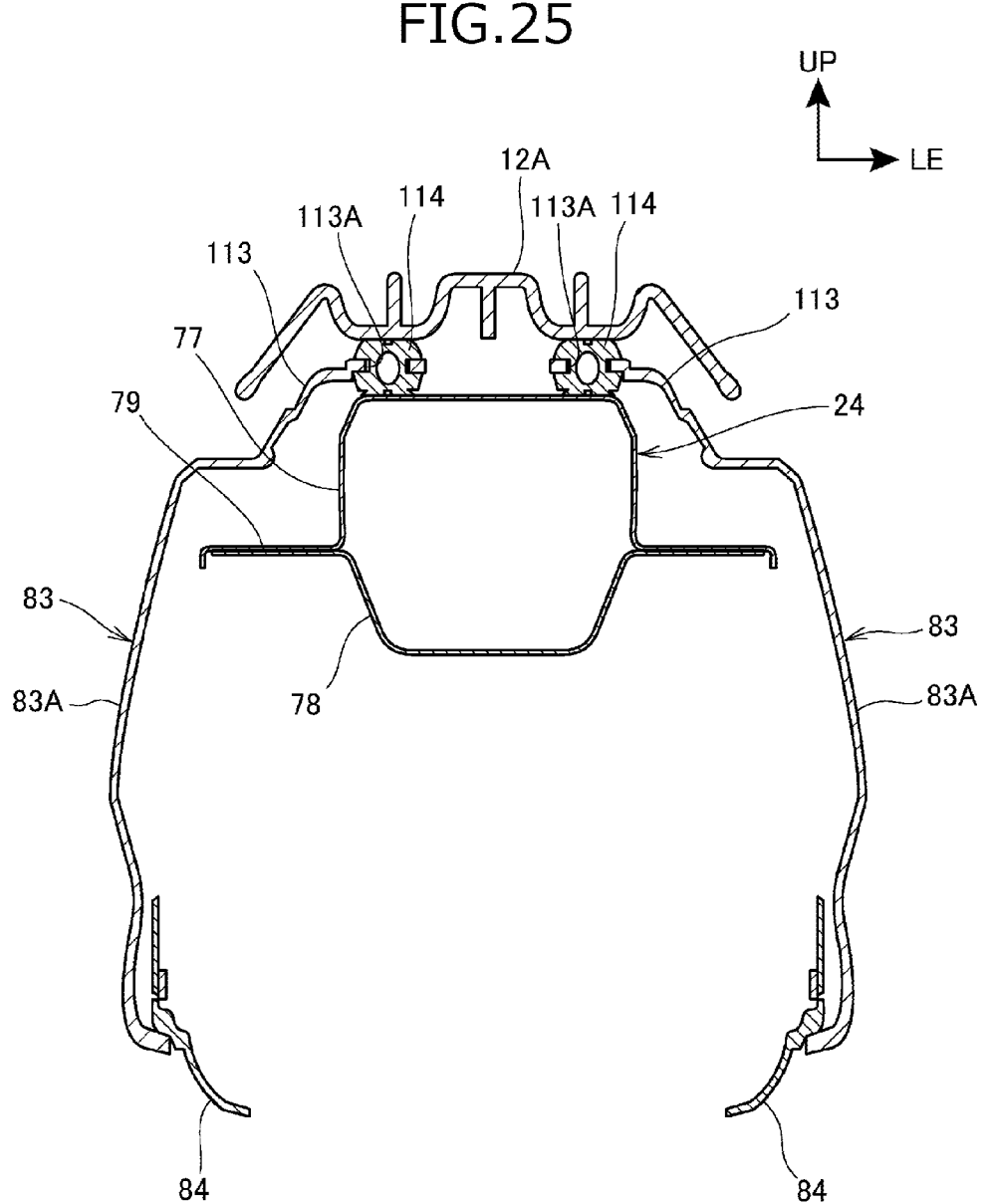
FIG. 25 is a cross-sectional view taken along XXV-XXV of FIG. 8.

FIG. 25 is a cross-sectional view taken along XXV-XXV of FIG. 8. In FIG. 25, only the bottom plate 12A for receiving the cushion of the seat 12 is illustrated.

As shown in FIG. 25, the elastic member 114 secured to the upper plate portion 113 is pinched between the bottom plate 12A of the seat 12 and the upper surface of the rear portion of the fuel tank 24, whereby the rear cover 83 is fixed to the vehicle body. Therefore, the rear cover 83 can be supported on the vehicle body with a simple structure by using no fastening portion.

As described above, according to the embodiment to which the present invention is applied, the tank cover 60 covering the fuel tank 24 is divided into the front cover 82 having the wide portion 82B at which the tank cover 60 is largest in the width direction at the front side of the fuel tank 24, the rear cover 83 having the width-narrow knee grip portion 83A which is continuous with the seat 12 at the rear side of the front cover 82, and the lower cover 84 which extends in the front-and-rear direction to form the lower portion of the tank cover 60. Therefore, each of the front cover 82, the rear cover 83 and the lower cover 84 can be exchanged in accordance with a site to be exchanged. That is, according to the present invention, the front cover 82 having the wide portion 82B which is apt to be damaged because it is large in the width direction can be independently exchanged, the rear cover 83 which is apt to be damaged by the occupant's knee grip can be independently exchanged, and the lower cover 84 which is apt to be damaged by the occupant's shoe can be independently exchanged. Therefore, a desire site of the tank cover 60 can be easily exchanged as occasion demands.

Furthermore, the top cover 81, the front cover 821, the rear cover 83, the lower cover 84, the center cover 85, the inner cover 86 and the garnish 89 are configured in the divided structure. Therefore, by preparing covers having different colors for each of the above covers, the color of a cover at a desired site of the tank cover 60 can be changed in accordance with user's taste, and the outer appearance of the vehicle can be easily changed.

The front cover 82 has the front cover upper portion 82A which extends from the wide portion 82B to the lower upper side and is continued to the upper surface of the fuel tank 24, the rear cover 83 has the front extension portion 83C extending from the knee grip portion 83A to the front lower side, and the center cover 85 is sandwiched between the front cover upper portion 82A of the front cover 82 and the front extension portion 83C of the rear cover 83, so that the center cover 85 is hardly damaged. Furthermore, the center cover 85 is sandwiched between the front cover 82 and the rear cover 83 to fill the space T, so that the support stiffness of the center cover 85 can be enhanced although the center cover 85 is provided as a separate cover.

Furthermore, since the inner cover 86 is provided between the front cover 82 and the top cover 81 in front view, the influence of the traveling wind from the front side on the front cover 82 can be reduced, and the front cover 82 can be surely fixed. The direction of the traveling wind is controlled by the inner cover 86, whereby the inside of the tank cover 60 can be cooled. In addition, the front cover 82 and the top cover 81 are joined to each other by the inner cover 86 in the vehicle width direction, so that the rigidity of the tank cover 60 can be enhanced.

Furthermore, the upper surface of the fuel tank 24 can be covered by the top cover 81, so that the fuel tank 24 can be protected.

The front cover 82 is fixed to the top cover 81 through the hook projections 98A and the fixing portions 99, so that it is unnecessary to provide the fuel tank 24 with a fixing portion for the front cover 82 and thus the structure can be simplified.

Furthermore, the top cover 81 is secured to the ring member 72 which is secured to the outer peripheral portion of the fuel filler opening 70 at the center of the fuel tank 24, and the top cover 81 can be effectively supported by the ring member 72, so that the number of the fixing portions of the tank cover 60 can be minimized.

Still furthermore, the rear cover 83 can be reinforced by the garnish 89 secured to the rear cover 83.

The key cylinder 52 for seat lock is disposed at the inside of a portion which is reinforced by securing the garnish 89, so that the key cylinder 52 can be surely supported.

DESCRIPTION OF THE REFERENCE NUMERALS 1 motorcycle
12 seat
24 fuel tank
25 handle
52 key cylinder
60 tank cover
70 fuel filler opening
72 ring member (securing ring)
81 top cover
82 front cover
82B wide portion
83 rear cover
83A knee grip portion
84 lower cover
85 center cover
86 inner cover
89 garnish

The invention claimed is:

1. A tank cover structure for a motorcycle having a steering handle, a seat on which an occupant sits, a fuel tank disposed behind the steering handle and in front of the seat, and a tank cover covering the fuel tank, comprising:
said tank cover being divided into:
a front cover having a wide portion at which the tank cover is widest in a width direction at a front side of the fuel tank,
a rear cover having a narrow knee grip portion continuing to the seat at a rear side of the front cover for gripping by the knees of an occupant sitting on the seat, and
a lower cover extending in a front-and-rear direction to form a lower portion of the tank cover,
wherein the front cover, rear cover or lower cover can be independently removed, relative to each other, from the motorcycle,
wherein the front cover, rear cover or lower cover are releasably attached to each other by a first set of connectors,
wherein a second set of connectors connects at least one of the covers to the fuel tank, the second set of connectors being different from the first set of connectors,
wherein the first set of connectors comprises two mating connectors and the second set of connectors comprises two mating connectors secured to one another with a fastener, and
wherein the front cover extends from the wide portion to a rear upper side so as to be continued to an upper surface of the fuel tank, the rear cover extends from the knee grip portion to a front lower side, and the tank cover has a center cover as a separate body that is sandwiched between the front cover and the rear cover to fill a space.

2. The tank cover structure for the motorcycle according to claim 1, further comprising a top cover covering the upper surface of the fuel tank.

3. The tank cover structure for the motorcycle according to claim 2, wherein an inner cover is provided between the front cover and the top cover in front view.

4. The tank cover structure for the motorcycle according to claim 3, wherein the front cover is fixed to the top cover.

5. The tank cover structure for the motorcycle according to claim 3, wherein the fuel tank has a fuel filler opening at an upper portion thereof, and the top cover is secured to a securing ring secured to the fuel filler opening.

6. The tank cover structure for the motorcycle according to claim 3, wherein a garnish is provided to a rear end of the rear cover.

7. The tank cover structure for the motorcycle according to claim 2, wherein the front cover is fixed to the top cover.

8. The tank cover structure for the motorcycle according to claim 7, wherein the fuel tank has a fuel filler opening at an upper portion thereof, and the top cover is secured to a securing ring secured to the fuel filler opening.

9. The tank cover structure for the motorcycle according to claim 7, wherein a garnish is provided to a rear end of the rear cover.

10. The tank cover structure for the motorcycle according to claim 2, wherein the fuel tank has a fuel filler opening at an upper portion thereof, and the top cover is secured to a securing ring secured to the fuel filler opening.

11. The tank cover structure for the motorcycle according to claim 2, wherein a garnish is provided to a rear end of the rear cover.

12. The tank cover structure for the motorcycle according to claim 1, wherein a garnish is provided to a rear end of the rear cover.

13. The tank cover structure for the motorcycle according to claim 12, wherein a key cylinder is provided inside the garnish, and the key cylinder is configured to switch locking/unlocking of a seat lock for locking the seat.

14. The tank cover structure for the motorcycle according to claim 1, wherein the lower cover is releasably attached to a lower edge of the front cover and a lower edge of the rear cover.

15. A tank cover structure for a motorcycle having a steering handle, a seat on which an occupant sits, a fuel tank disposed behind the steering handle and in front of the seat, and a tank cover covering the fuel tank, comprising:
said tank cover being divided into:
a front cover having a wide portion at which the tank cover is widest in a width direction at a front side of the fuel tank,
a rear cover having a narrow knee grip portion continuing to the seat at a rear side of the front cover for gripping by the knees of an occupant sitting on the seat, and
a center cover attached to a lower edge of the front cover and a top edge of the rear cover so as to be between the front cover and rear cover,
wherein the front cover, rear cover or center cover can be independently removed, relative to each other, from the motorcycle.

16. The tank cover structure for the motorcycle according to claim 15, further comprising a top cover attached to a top edge of the front cover.

17. The tank cover structure for the motorcycle according to claim 15, further comprising a lower cover extending in a front-and-rear direction to form a lower portion of the tank cover,
wherein the lower cover is releasably attached to the lower edge of the front cover and a lower edge of the rear cover.

18. A tank for a motorcycle, comprising:
a tank body having an outer surface and a filling opening;
a tank cover, the tank cover comprising:

a top cover having an opening over the filling opening;
a front cover having a wide portion at which the tank cover is widest in a width direction at a front side of the tank body; and
a rear cover having a narrow knee grip portion continuing to a seat at a rear side of the front cover for gripping by the knees of an occupant sitting on the seat,
wherein the front cover, rear cover and top cover are releasably attached to each other by a first set of connectors,
wherein a second set of connectors connects the top cover to the fuel tank, the second set of connectors being different from the first set of connectors, and
wherein the second set of connectors comprises a first connector attached to the outer surface of the fuel tank and a second connector extending from the top cover.

* * * * *